(12) United States Patent
Furukawa

(10) Patent No.: US 11,495,416 B2
(45) Date of Patent: Nov. 8, 2022

(54) CAPACITOR ARRAY AND COMPOSITE ELECTRONIC COMPONENT

(71) Applicant: Murata Manufacturing Co., Ltd., Nagaokakyo (JP)

(72) Inventor: Takeshi Furukawa, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 129 days.

(21) Appl. No.: 16/815,126

(22) Filed: Mar. 11, 2020

(65) Prior Publication Data

US 2020/0312576 A1    Oct. 1, 2020

(30) Foreign Application Priority Data

Mar. 29, 2019  (JP) .............................. JP2019-067972
Jul. 17, 2019  (JP) .............................. JP2019-131951

(51) Int. Cl.
  *H01G 9/26*    (2006.01)
  *H01G 9/012*   (2006.01)
  *H01G 9/15*    (2006.01)
  *H01G 9/10*    (2006.01)

(52) U.S. Cl.
  CPC .............. *H01G 9/26* (2013.01); *H01G 9/012* (2013.01); *H01G 9/10* (2013.01); *H01G 9/15* (2013.01)

(58) Field of Classification Search
  CPC .................................... H01G 4/38; H01G 9/08
  USPC ......................................................... 361/541
  See application file for complete search history.

(56) References Cited

U.S. PATENT DOCUMENTS

| 4,599,788 A * | 7/1986 | Love ................... H01G 9/0029 29/25.03 |
| 5,926,363 A | 7/1999 | Kuriyama |
| 6,346,127 B1 * | 2/2002 | Kuriyama .............. H01G 2/065 29/25.03 |
| 2007/0177336 A1 | 8/2007 | Kuriyama |

FOREIGN PATENT DOCUMENTS

| CN | 1938801 A | 3/2007 |
| JP | H06314634 A | 11/1994 |
| JP | H1074668 A | 3/1998 |
| JP | 2004281750 A | 10/2004 |
| JP | 2010171304 A | 8/2010 |
| JP | 2012044112 A * | 3/2012 |

OTHER PUBLICATIONS

Chinese Office Action issued for Chinese Application No. 202010233923.7, date of Chinese Office Action dated Sep. 22, 2021.
Japanese Office Action issued for JP Patent Application No. 2019-131951, Japanese Office Action dated Apr. 5, 2022.

* cited by examiner

*Primary Examiner* — Eric W Thomas
(74) *Attorney, Agent, or Firm* — ArentFox Schiff LLP

(57) ABSTRACT

A capacitor array that includes a plurality of solid electrolytic capacitor elements, a sheet-shaped first sealing layer, and a sheet-shaped second sealing layer. The plurality of solid electrolytic capacitor elements include an anode plate, a porous layer, a dielectric layer, and a cathode layer. Each of the solid electrolytic capacitor elements are partitioned from each other by a slit-shaped removal part and have a first main surface and a second main surface.

18 Claims, 22 Drawing Sheets

61 63 62 24 52 50 53 51

1C 61 63 62 24 52 53 51

1C

1D 24 61 63 62    51

1D

CAPACITOR ARRAY AND COMPOSITE ELECTRONIC COMPONENT

CROSS REFERENCE TO RELATED APPLICATIONS

The present application claims priority to Japanese Patent Application No. 2019-067972, filed Mar. 29, 2019, and Japanese Patent Application No. 2019-131951, filed Jul. 17, 2019, the entire contents of each of which are incorporated herein by reference.

FIELD OF THE INVENTION

The present invention relates to a capacitor array and a composite electronic component.

BACKGROUND OF THE INVENTION

Patent Literature 1 (JP 2004-281750 A) discloses a solid electrolytic capacitor array provided with a capacitor element group including a plurality of capacitor elements, one or more anode terminals connected to and led out from each of one or more anode lead wires of the capacitor elements of the capacitor element group, one or more cathode terminals connected to and led out from a cathode layer of the capacitor elements, and an exterior resin layer covering the capacitor elements, in which the anode terminal(s) and the cathode terminal(s) are configured as external terminals.

SUMMARY OF THE INVENTION

According to Patent Literature 1, by connecting the plurality of capacitor elements to the anode terminal(s) and the cathode terminal(s) to form an array structure, low equivalent series resistance (ESR) and low equivalent series inductance (ESL) are achieved, and a solid electrolytic capacitor array with excellent high-frequency properties can be manufactured easily.

However, in the case of forming an array out of a plurality of capacitor elements using the method described in Patent Literature 1, because it is necessary to connect pre-formed capacitor elements to each other, there are problems such as the tendency for the manufacturing process to become complicated, and a low volumetric capacity of the capacitor array as a whole. For this reason, it cannot be said that performance is optimal with respect to higher frequencies.

To address the above problems, one object of the present invention is to provide a capacitor array having a high degree of freedom in layout, in which a plurality of solid electrolytic capacitor elements are aggregated into a single array. Another object of the present invention is to provide a composite electronic component in which an electronic component is mounted on external electrodes of the capacitor array.

A capacitor array according to the present invention includes: a plurality of solid electrolytic capacitor elements, each of the solid electrolytic capacitor elements including an anode plate made of a valve-action metal, a porous layer on at least one main surface of the anode plate, a dielectric layer on a surface of the porous layer, and a cathode layer including a solid electrolyte layer on a surface of the dielectric layer, each of the solid electrolytic capacitor elements being partitioned from each other by a slit-shaped removal part and having a first main surface and a second main surface which oppose each other in a thickness direction thereof; a sheet-shaped first sealing layer on the first main surface side of each of the plurality of solid electrolytic capacitor elements; and a sheet-shaped second sealing layer covering the plurality of solid electrolytic capacitor elements from the second main surface side.

A composite electronic component according to the present invention includes: the capacitor array according to the present invention; external electrodes on the outside of the first sealing layer or the second sealing layer of the capacitor array and connected, respectively, to each of the anode plate and the cathode layer of the capacitor array; and an electronic component connected to the external electrodes.

According to the present invention, it is possible to provide a capacitor array having a high degree of freedom in layout, in which a plurality of solid electrolytic capacitor elements are aggregated into a single array.

BRIEF DESCRIPTION OF THE DRAWINGS

FIG. 3A is a perspective view schematically illustrating an example of a step of preparing a chemically treated foil, while

FIG. 4A is a perspective view schematically illustrating an example of a step of forming an insulating layer, while

FIG. 6A is a perspective view schematically illustrating an example of a step of forming a solid electrolyte layer, while

FIG. 7A is a perspective view schematically illustrating an example of a step of forming a carbon layer, while

FIG. 8A is a perspective view schematically illustrating an example of a step of forming a copper layer, while

FIG. 9A is a perspective view schematically illustrating an example of a step of disposing a first sealing layer, while

FIG. 10A is a perspective view schematically illustrating an example of a step of cutting a solid electrolytic capacitor sheet, while

FIG. 12A is a perspective view schematically illustrating an example of a step of disposing a second sealing layer, while

FIG. 13A is a perspective view schematically illustrating an example of a step of partitioning into a plurality of capacitor arrays, while

FIG. 19A is a projected plan view viewing a first modification of an anode and cathode structure from a second sealing layer side, while

FIG. 20A is a projected plan view viewing a second modification of an anode and cathode structure from a second sealing layer side, while

FIG. 21A is a projected plan view viewing a third modification of an anode and cathode structure from a second sealing layer side, while

FIG. 22A is a projected plan view viewing a fourth modification of an anode and cathode structure from a second sealing layer side, while

DETAILED DESCRIPTION OF THE PREFERRED EMBODIMENTS

Hereinafter, a capacitor array and a composite electronic component according to the present invention will be described.

However, the present invention is not limited to the following configurations, and the following configurations may be appropriately modified within a scope that does not depart from the gist of the present invention. Note that a combination of two or more of the individual desired configurations of the present invention described below is itself a configuration of the present invention.

[Capacitor Array]

A capacitor array according to the present invention includes a plurality of solid electrolytic capacitor elements, a sheet-shaped first sealing layer disposed on a first main surface side of each of the plurality of solid electrolytic capacitor elements, and a sheet-shaped second sealing layer disposed so as to cover the plurality of solid electrolytic capacitor elements from a second main surface side thereof opposite the first main surface side.

In the capacitor array according to the present invention, the plurality of solid electrolytic capacitor elements are originally a single solid electrolytic capacitor sheet, and the solid electrolytic capacitor elements are partitioned from each other by a slit-shaped sheet removal part.

By forming the plurality of solid electrolytic capacitor elements all at once from a single sheet, a capacitor array having a high degree of freedom in layout can be manufactured at low cost. Consequently, different interconnect pathways can be flexibly accommodated for individual applications such as a central processing unit (CPU) or a power management IC (PMIC).

Also, by changing the size when partitioning the solid electrolytic capacitor elements, solid electrolytic capacitor elements with different properties can be disposed inside the capacitor array. With this arrangement, it is possible to match the characteristic impedance over a wide band when connecting elements in parallel.

In the capacitor array according to the present invention, the first sealing layer and the second sealing layer refer to layers that contain a sealing resin such as an epoxy resin or a phenol resin. It is necessary to control the glass transition temperature Tg and the elastic modulus of the sealing layers to keep the sealing layers from imparting stress to the solid electrolytic capacitor element portion when the capacitor array is formed and when thermal stress is applied. Specifically, it is preferable for the sealing layers to be predominately filled with an inorganic filler such as alumina or silica.

Figure 1:
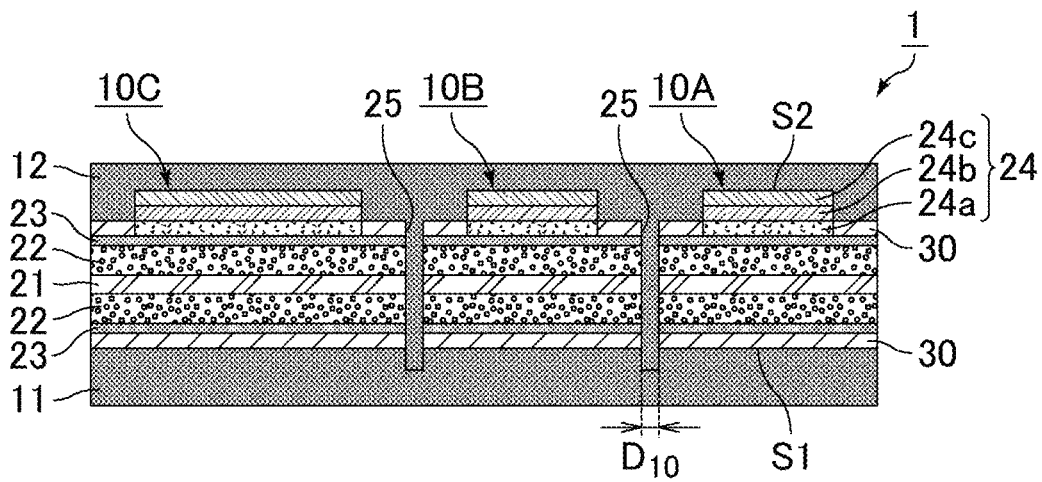
FIG. 1 is a cross-section view schematically illustrating an example of a capacitor array according to the present invention.

FIG. 1 is a cross-section view schematically illustrating an example of the capacitor array according to the present invention.

A capacitor array 1 illustrated in FIG. 1 includes solid electrolytic capacitor elements 10A, 10B, and 10C, a sheet-shaped first sealing layer 11, and a sheet-shaped second sealing layer 12. The solid electrolytic capacitor element 10A has a first main surface S1 and a second main surface S2 which oppose each other in the thickness direction (the vertical direction in FIG. 1), and the first main surface S1 is disposed on the first sealing layer 11. The same applies to the solid electrolytic capacitor elements 10B and 10C. The second sealing layer 12 is disposed covering the solid electrolytic capacitor elements 10A, 10B, and 10C on the first sealing layer 11 from the second main surface S2 side. Consequently, the capacitor array 1 illustrated in FIG. 1 has a sheet-shaped shape overall.

In the capacitor array 1 illustrated in FIG. 1, the solid electrolytic capacitor element 10A includes an anode plate 21, a porous layer 22 provided on at least one main surface of the anode plate 21, a dielectric layer 23 provided on the surface of the porous layer 22, and a cathode layer 24 provided on the surface of the dielectric layer 23. In FIG. 1, the cathode layer 24 includes a solid electrolyte layer 24a provided on the surface of the dielectric layer 23, a carbon layer 24b provided on the surface of the solid electrolyte layer 24a, and a copper layer 24c provided on the surface of the carbon layer 24b. In FIG. 1, the porous layer 22 and the dielectric layer 23 are provided on both main surfaces of the anode plate 21 while the cathode layer 24 is provided only on the second main surface S2 side, but the cathode layer 24 may be provided only on the first main surface S1 side, or the cathode layer 24 may be provided on both the first main surface S1 side and the second main surface S2 side. Also, the porous layer 22 may be provided on both main surfaces of the anode plate 21 or on either one of the main surfaces. The same applies to the solid electrolytic capacitor elements 10B and 10C.

Figure 8A:
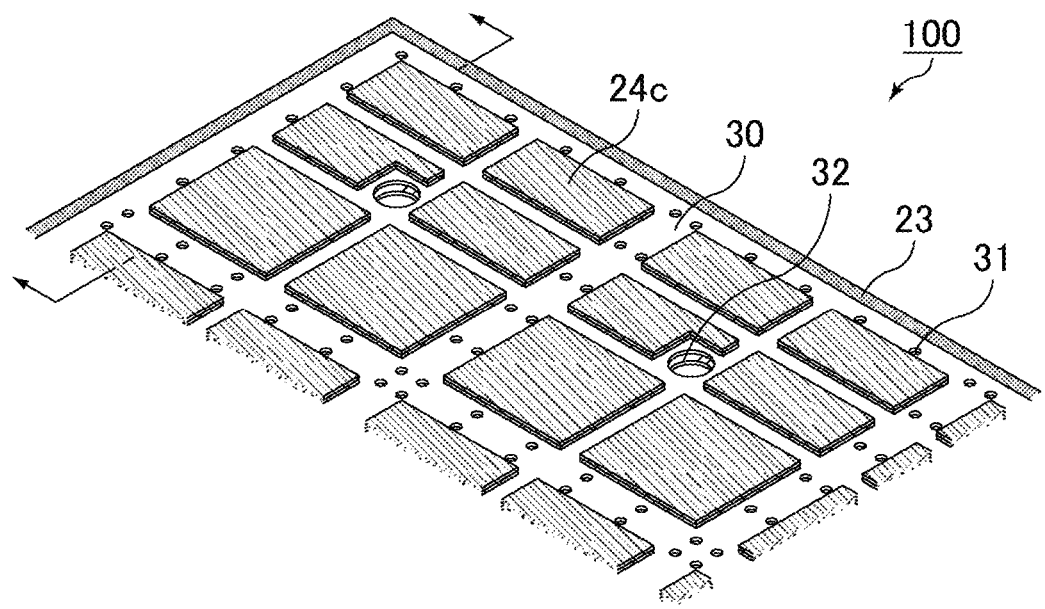
Figure 8B:
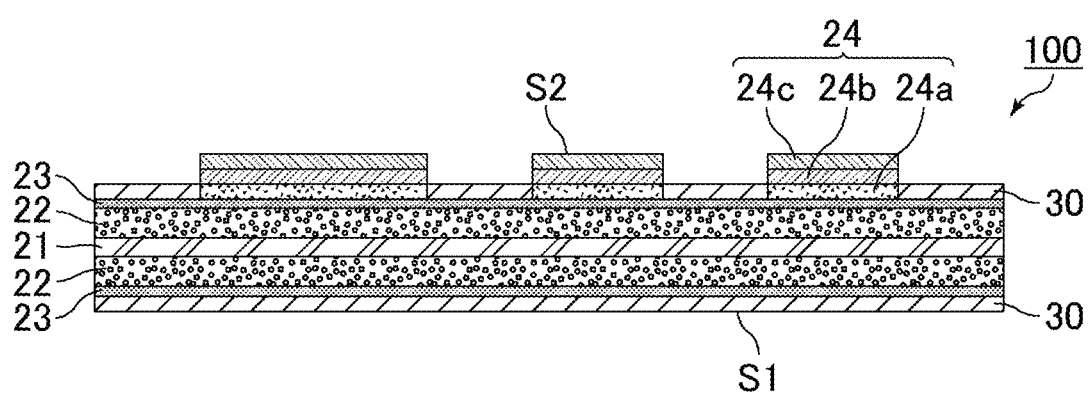
FIG. 8B is a cross-section view of the same.

The solid electrolytic capacitor elements 10A, 10B, and 10C are originally a single solid electrolytic capacitor sheet 100 (see FIGS. 8A, 8B, and the like). The solid electrolytic capacitor element 10A is partitioned from the solid electrolytic capacitor element 10B and the solid electrolytic capacitor element 10B is partitioned from the solid electrolytic capacitor element 10C by a slit-shaped sheet removal part 25. Consequently, the configuration is the same for each of the solid electrolytic capacitor elements 10A, 10B, and 10C. Additionally, the distance from the underside of the second sealing layer 12 to the anode plate 21 of each of the solid electrolytic capacitor elements 10A, 10B, and 10C is constant.

As illustrated in FIG. 1, the second sealing layer 12 gets in between the anode plates 21 of adjacent solid electrolytic capacitor elements on the first sealing layer 11 proceeding toward the first sealing layer 11, and preferably also penetrates a portion of the first sealing layer 11.

When the second sealing layer 12 penetrates a portion of the first sealing layer 11, adhesion between the first sealing layer 11 and the second sealing layer 12 is improved, and therefore the reliability of the capacitor array 1 is improved.

In the capacitor array 1 illustrated in FIG. 1, the second sealing layer 12 gets in between the anode plates 21 of all adjacent solid electrolytic capacitor elements on the first sealing layer 11 proceeding toward the first sealing layer 11 and furthermore penetrates a portion of the first sealing layer 11, but locations where the second sealing layer 12 does not penetrate a portion of the first sealing layer 11 may also exist. In addition, the second sealing layer 12 does not have to penetrate the first sealing layer 11.

As illustrated in FIG. 1, an insulating layer 30 for insulating the anode plate 21 and the cathode layer 24 from each other is preferably provided on the surface of the dielectric layer 23 where the cathode layer 24 is not provided on the second main surface S2 side. In FIG. 1, the insulating layer 30 is provided on the surface of the dielectric layer 23 on the first main surface S1 side, but the insulating layer 30 does not have to be provided on the surface of the dielectric layer 23 on the first main surface S1 side.

Although not illustrated in FIG. 1, as described later, external electrodes connected to each of the anode plate 21 and the cathode layer 24 are provided on the outside of the first sealing layer 11 or the second sealing layer 12.

The way of connecting an external electrode to the anode plate or the cathode layer is not limited, but preferably, a through-electrode that penetrates through the first sealing layer or the second sealing layer in the thickness direction is provided, and the external electrode is connected to the anode plate or the cathode layer via the through-electrode. By connecting via the through-electrode, the lead-out distance from the anode plate or the cathode layer to the external electrode can be shortened.

In the capacitor array 1 illustrated in FIG. 1, the side faces of the solid electrolytic capacitor elements 10A and 10C are exposed, but these side faces may also be covered by the first sealing layer or the second sealing layer, or may be covered by an insulating layer, for example. A stress relaxation layer, a moisture barrier, and the like may also be provided between the solid electrolytic capacitor elements and the first sealing layer or the second sealing layer, for example.

In the capacitor array according to the present invention, the interval between the anode plates of adjacent solid electrolytic capacitor elements on the first sealing layer (in FIG. 1, the length labeled $D_{10}$) is not limited, but is preferably 15 μm to 500 μm, more preferably 15 μm to 200 μm, even more preferably 30 μm to 200 μm, most preferably 50 μm to 150 μm.

In the capacitor array according to the present invention, the number of solid electrolytic capacitor elements disposed on the first sealing layer may be any number insofar as there are at least two elements. The solid electrolytic capacitor elements may be disposed in a one-dimensional line or a two-dimensional plane on the first sealing layer. Also, the solid electrolytic capacitor elements may be disposed regularly or irregularly on the first sealing layer. Features such as the sizes and shapes of the solid electrolytic capacitor elements may be the same, partially different, or all different.

Figure 2:
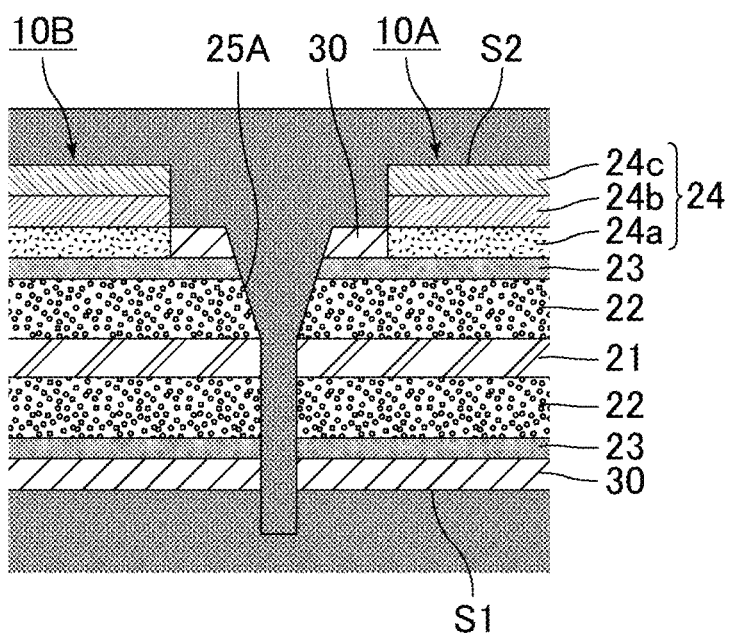
FIG. 2 is an enlarged cross-section view schematically illustrating another example of a sheet removal part.

FIG. 2 is an enlarged cross-section view schematically illustrating another example of the sheet removal part.

A sheet removal part 25A illustrated in FIG. 2 has a taper that decreases in width proceeding from the second main surface S2 toward the first main surface S1 of the solid electrolytic capacitor elements 10A and 10B. The taper of the sheet removal part 25A does not reach the porous layer 22 or even the anode plate 21 on the first main surface S1 side of the solid electrolytic capacitor elements 10A and 10B.

In the capacitor array according to the present invention, the sheet removal part preferably has a taper that decreases in width proceeding from one main surface toward the other main surface of the solid electrolytic capacitor elements. The sheet removal part may have a taper that decreases in width proceeding from the second main surface toward the first main surface of the solid electrolytic capacitor elements, or a taper that decreases in width proceeding from the first main surface toward the second main surface of the solid electrolytic capacitor elements.

The taper preferably does not reach the anode plate of the solid electrolytic capacitor elements. Particularly, in the case where the porous layer is provided on both main surfaces of the anode plate, the taper preferably does not reach the porous layer near the other main surface of the solid electrolytic capacitor elements. In the case where the taper decreases in width proceeding from the second main surface toward the first main surface of the solid electrolytic capacitor elements, the taper preferably does not reach the porous layer near the first main surface of the solid electrolytic capacitor elements. On the other hand, in the case where the taper decreases in width proceeding from the first main surface toward the second main surface of the solid electrolytic capacitor elements, the taper preferably does not reach the porous layer near the second main surface of the solid electrolytic capacitor elements.

In the capacitor array according to the present invention, the insulating layer preferably contains a resin. Examples of the resin forming the insulating layer include insulating resins such as polyphenylsulfone resin, polyethersulfone resin, cyanate ester resin, fluororesin (such as tetrafluoroethylene and tetrafluoroethylene/perfluoroalkylvinylether copolymer), polyimide resin, polyamide-imide resin, epoxy resin, and derivatives or precursors of the above. Note that the insulating resin may also contain the same resin as the first sealing layer and the second sealing layer. However, unlike the first sealing layer and the second sealing layer, if the insulating layer contains an inorganic filler, there is a risk of adverse influence on the effective parts of the solid electrolytic capacitor elements, and therefore the insulating layer preferably contains resin alone.

In the capacitor array according to the present invention, the first sealing layer and the second sealing layer preferably contain a resin. Examples of the resin forming the first sealing layer and the second sealing layer include an epoxy resin and a phenol resin. The first sealing layer and the second sealing layer preferably further contain a filler. Examples of the filler contained in the first sealing layer and the second sealing layer include an inorganic filler such as silica particles, alumina particles, or metal particles. The resin forming the first sealing layer may be the same as or different from the resin forming the second sealing layer.

Each of the first sealing layer and the second sealing layer may have only a single layer, or may have two or more layers. The number of layers in the first sealing layer may be the same as or different from the number of layers in the second sealing layer. In the case where the first sealing layer or the second sealing layer has two or more layers, a through-electrode that penetrates through each sealing layer existing between the anode plate or the cathode layer and the external electrode in the thickness direction may be provided, while in addition, an internal electrode may also be provided between the sealing layers, and the anode plate or the cathode layer may be connected to the external electrode via the through-electrode and each internal electrode.

In the capacitor array according to the present invention, the anode plate of the solid electrolytic capacitor elements is made of a valve-action metal that functions as a valve. Examples of valve-action metal include metals such as aluminum, tantalum, niobium, titanium, and zirconium, as well as alloys containing at least one of these metals. Of these, aluminum or an aluminum alloy is preferable.

The shape of the anode plate is preferably tabular, and more preferably a foil. It is sufficient for the anode plate to have the porous layer on at least one main surface, but may also have the porous layer on both main surfaces. The porous layer is preferably an etching layer formed on the surface of the anode plate.

The thickness of the anode plate before the etching treatment is preferably 60 μm to 200 μm. The thickness of the non-etched core after the etching treatment is preferably 15 μm to 70 μm. The thickness of the porous layer is designed by accounting for the demanded withstand voltage and capacitance, but the porous layer on either side of the core preferably has a combined thickness of 10 μm to 180 μm.

In the capacitor array according to the present invention, the dielectric layer of the solid electrolytic capacitor elements is provided on the surface of the porous layer. Because the dielectric layer is formed over the surface of the porous layer, pores (recesses) are formed in the dielectric layer. The dielectric layer is preferably an oxide film of the valve-action metal described above. For example, in the case where an aluminum foil is used as the anode plate, by performing an anodic oxidation treatment (also referred to as a chemical conversion treatment) on the surface of the aluminum foil in an aqueous solution containing ammonium adipate or the like, the dielectric layer can be formed as an oxide film.

The thickness of the dielectric layer is designed by accounting for the demanded withstand voltage and capacitance, but is preferably 10 nm to 100 nm.

In the capacitor array according to the present invention, the cathode layer of the solid electrolytic capacitor elements is provided on the surface of the dielectric layer. The cathode layer includes a solid electrolyte layer provided on the surface of the dielectric layer. Preferably, the cathode layer further includes a conductor layer provided on the surface of the solid electrolyte layer.

Examples of the material used to form the solid electrolyte layer include conductive polymers such as polypyrroles, polythiophenes, and polyanilines. Of these, polythiophenes are preferable, and poly(3,4-ethylenedioxythiophene) called PEDOT is particularly preferable. Additionally, the above conductive polymers may also include dopants such as polystyrene sulfonate (PSS).

The solid electrolyte layer is formed by a method of forming a polymer film such as poly(3,4-ethylenedioxythiophene) on the surface of the dielectric layer using a treatment solution containing a monomer such as 3,4-ethylenedioxythiophene, or a method of applying a dispersion of a polymer such as poly(3,4-ethylenedioxythiophene) to the surface of the dielectric layer and then drying, for example. Note that the solid electrolyte layer is preferably formed by forming an inner layer that fills the pores (recesses) in the dielectric layer, and then forming an outer layer that covers the dielectric layer.

The solid electrolyte layer can be formed in a predetermined region by applying the above treatment solution or dispersion onto the dielectric layer by a method such as sponge transfer, screen printing, a dispenser, or inkjet printing. The thickness of the solid electrolyte layer is preferably 2 μm to 20 μm.

The conductor layer includes at least one of a conductive resin layer or a metal layer. The conductor layer may be the conductive resin layer only or the metal layer only. The conductor layer preferably covers the entire surface of the solid electrolyte layer.

Examples of the conductive resin layer include a conductive adhesive layer containing at least one conductive filler selected from the group consisting of silver filler, copper filler, nickel filler, and carbon filler.

Examples of the metal layer include a metal plating film and a metal foil.

The metal layer preferably contains at least one metal selected from the group consisting of nickel, copper, silver, and alloys containing at least one of these metals as a main component. Note that a "main component" refers to an element having the largest proportion (as a percentage of weight) among the elements contained in the alloy.

The conductor layer includes a carbon layer provided on the surface of the solid electrolyte layer and a cathode lead-out layer provided on the surface of the carbon layer, for example.

The carbon layer is formed to electrically and mechanically connect the solid electrolyte layer and the cathode lead-out layer.

The carbon layer can be formed in a predetermined region by applying a carbon paste onto the solid electrolyte layer by a method such as sponge transfer, screen printing, a dispenser, or inkjet printing. Note that the cathode lead-out layer is preferably stacked onto the carbon layer in the next step while the carbon layer is still in a viscous state before drying. The thickness of the carbon layer is preferably 2 μm to 20 μm.

The cathode lead-out layer is a printed electrode layer, for example.

The printed electrode layer can be formed by printing an electrode paste onto the carbon layer by a method such as screen printing, spray coating, a dispenser, or inkjet printing. The electrode paste preferably contains silver, copper, or nickel as a main component. In the case of screen printing, the thickness of the cathode lead-out layer may also be 2 μm to 20 μm.

The capacitor array according to the present invention is preferably manufactured as follows.

A method of manufacturing the capacitor array according to the present invention includes: preparing a solid electrolytic capacitor sheet having a first main surface and a second main surface which oppose each other in the thickness direction thereof; disposing a sheet-shaped first sealing layer on the first main surface side of the solid electrolytic capacitor sheet; partitioning the solid electrolytic capacitor sheet into a plurality of solid electrolytic capacitor elements disposed on the first sealing layer by cutting the solid electrolytic capacitor sheet in the thickness direction from the second main surface side; and disposing a sheet-shaped second sealing layer to cover the second main surface side of the plurality of solid electrolytic capacitor elements on the first sealing layer.

In the case of disposing the plurality of solid electrolytic capacitor elements individually on the first sealing layer, it is necessary to provide clearance between adjacent solid electrolytic capacitor elements. For this reason, as the solid electrolytic capacitor elements become more numerous, the proportion occupied by the clearance becomes larger, while on the other hand, the proportion occupied by the effective parts of the solid electrolytic capacitor elements becomes smaller.

In contrast, by cutting the solid electrolytic capacitor sheet from the second main surface side in a state with the first sealing layer disposed on the first main surface side of the solid electrolytic capacitor sheet to partition the solid electrolytic capacitor sheet into the plurality of solid electrolytic capacitor elements, a capacitor array having a large proportion occupied by the effective parts of the solid electrolytic capacitor elements can be manufactured.

Hereinafter, an example of each step will be described.

First, as illustrated in FIGS. 3A, 3B, 4A, 4B, 5, 6A, 6B, 7A, 7B, 8A, and 8B, the solid electrolytic capacitor sheet is prepared.

Figure 3A:
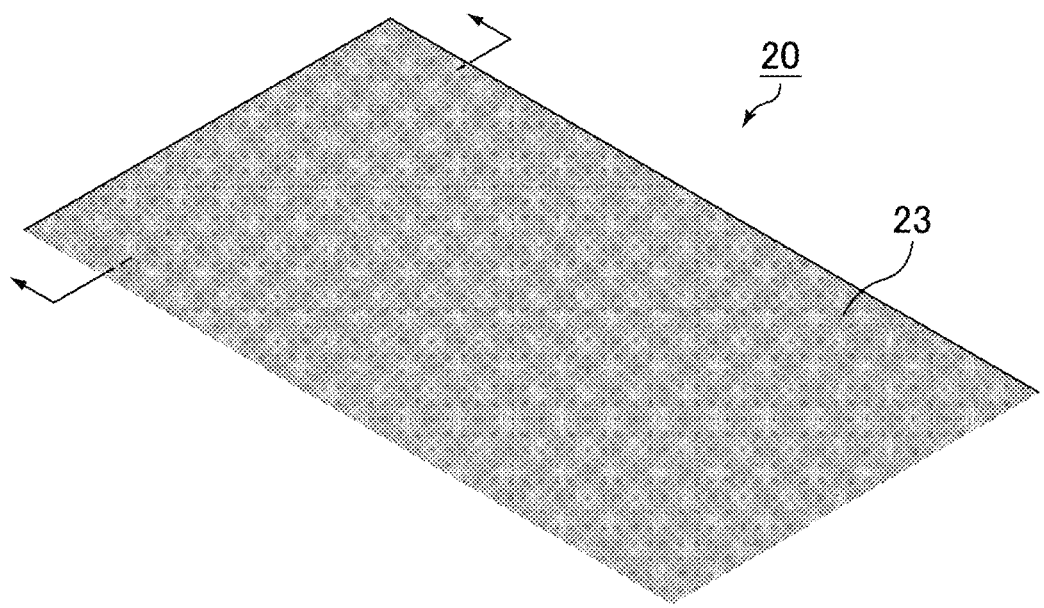
Figure 3B:
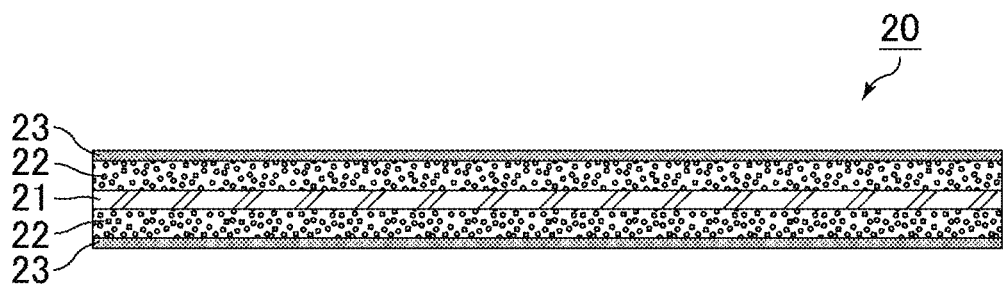
FIG. 3B is a cross-section view of the same.

FIG. 3A is a perspective view schematically illustrating an example of a step of preparing a chemically treated foil, while FIG. 3B is a cross-section view of the same.

A chemically treated foil 20 such as aluminum is prepared as the anode plate 21 in which the porous layer 22 is provided on at least one main surface and the dielectric layer 23 is provided on the surface of the porous layer 22. Instead of the chemically treated foil 20, a dielectric layer may be formed of an oxide film by, for example, preparing an aluminum foil as the anode plate, forming the porous layer by performing an etching treatment on the surface of the aluminum foil, and then performing an anodic oxidation treatment in an aqueous solution containing ammonium adipate or the like.

Figure 4A:
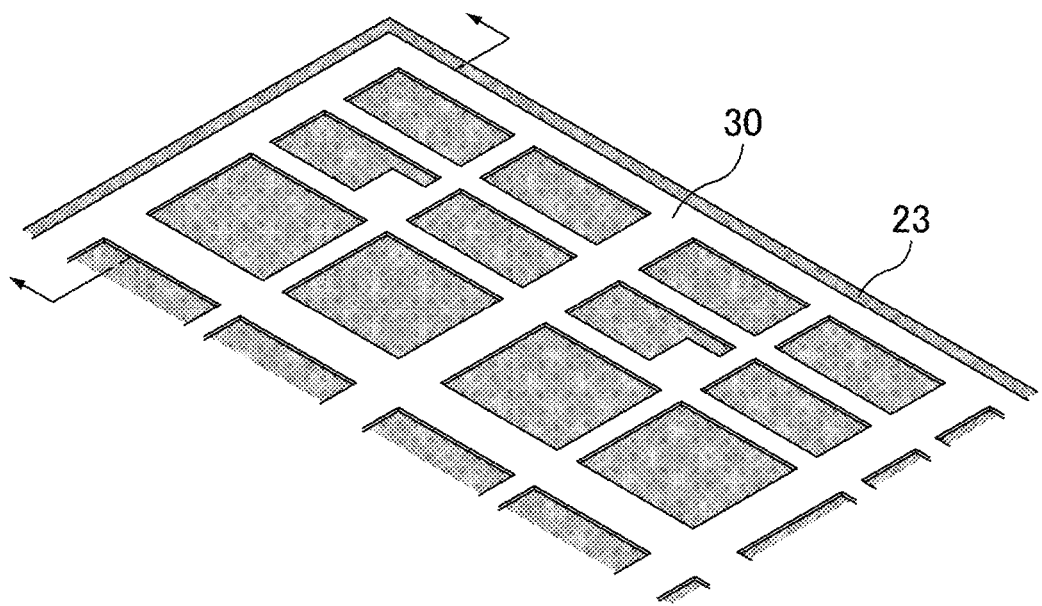
Figure 4B:
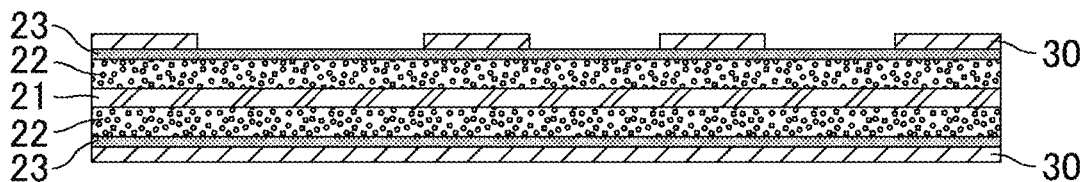
FIG. 4B is a cross-section view of the same.

FIG. 4A is a perspective view schematically illustrating an example of a step of forming the insulating layer, while FIG. 4B is a cross-section view of the same.

To demarcate the effective parts of the solid electrolytic capacitor elements, the insulating layer 30 is formed by applying an insulating resin on the dielectric layer 23. The method of applying the insulating resin is not limited, and may be a method such as a dispenser or screen printing, for example. In FIG. 4A, a region containing a total of six solid electrolytic capacitor elements (3 vertical×2 horizontal) is treated as a single capacitor array unit.

Figure 5:
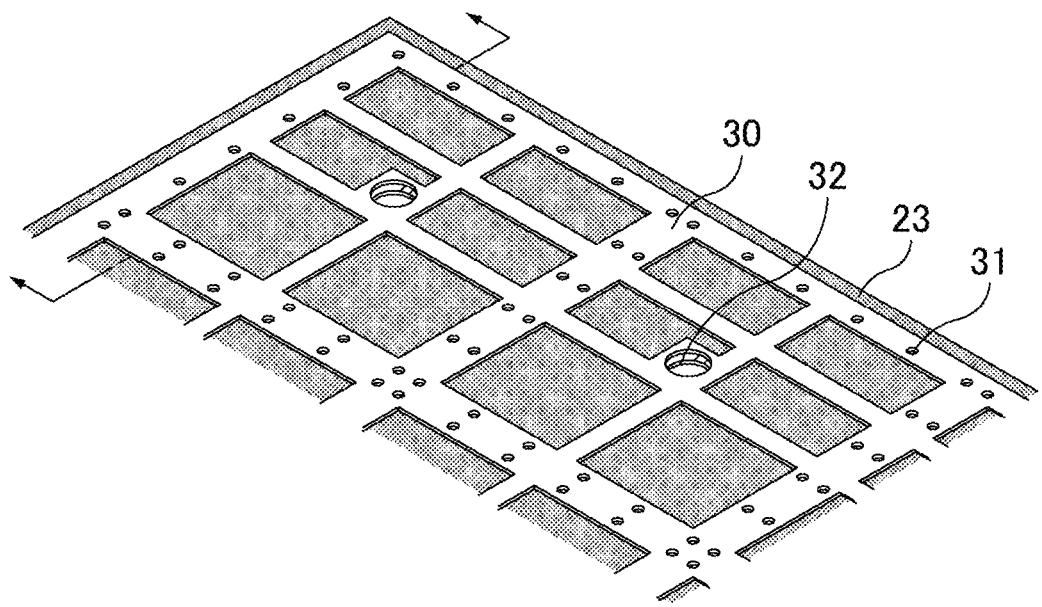
FIG. 5 is a perspective view schematically illustrating an example of a step of forming through-holes.

FIG. 5 is a perspective view schematically illustrating an example of a step of forming through-holes.

Through-holes 31 that penetrate the chemically treated foil 20 having the insulating layer 30 formed thereon in the thickness direction are formed at predetermined positions around the perimeter of each capacitor array unit.

As described later, through-electrodes are respectively formed inside the through-holes 31. The through-electrodes are used to connect the anode plate and an external electrode, or to connect the cathode layer and an external electrode. The through-electrodes may also be used to interconnect cathode layers formed sandwiching the anode plate. The through-electrodes may also be used for connections other than the above. As described below, an electronic component is mounted on the capacitor array according to the present invention to form a composite electronic component. In the composite electronic component, the external electrodes of the capacitor array are connected to an electronic component in the thickness direction, or electronic components other than the capacitor array are connected to each other in the thickness direction, via the through-electrodes formed in the through-holes 31.

Furthermore, as illustrated in FIG. 5, a through-hole 32 for disposing a different type of capacitor element from the solid electrolytic capacitor elements may also be formed.

Figure 6A:
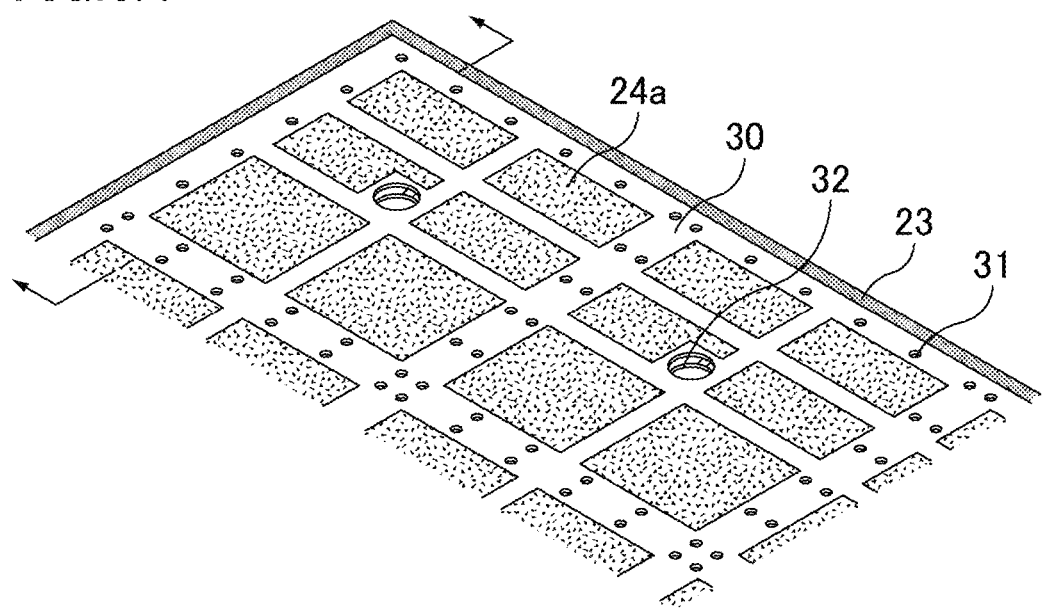
Figure 6B:
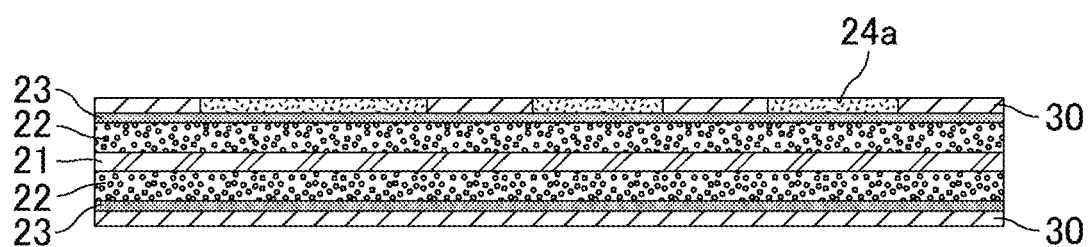
FIG. 6B is a cross-section view of the same.

FIG. 6A is a perspective view schematically illustrating an example of a step of forming the solid electrolyte layer, while FIG. 6B is a cross-section view of the same.

The solid electrolyte layer 24a is formed on the dielectric layer 23. For example, the solid electrolyte layer can be formed by a method of forming a polymer film such as poly(3,4-ethylenedioxythiophene) on the surface of the dielectric layer using a treatment solution containing a monomer such as 3,4-ethylenedioxythiophene, or a method of applying a dispersion of a polymer such as poly(3,4-ethylenedioxythiophene) to the surface of the dielectric layer and then drying. Note that the solid electrolyte layer is preferably formed by forming an inner layer that fills the pores in the dielectric layer, and then forming an outer layer that covers the dielectric layer.

Figure 7A:
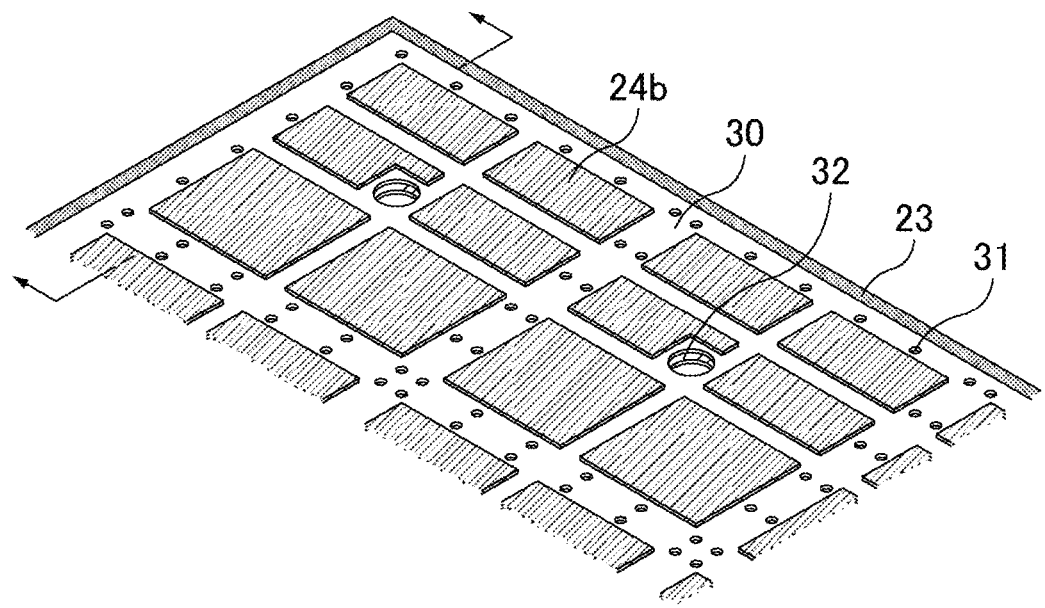
Figure 7B:
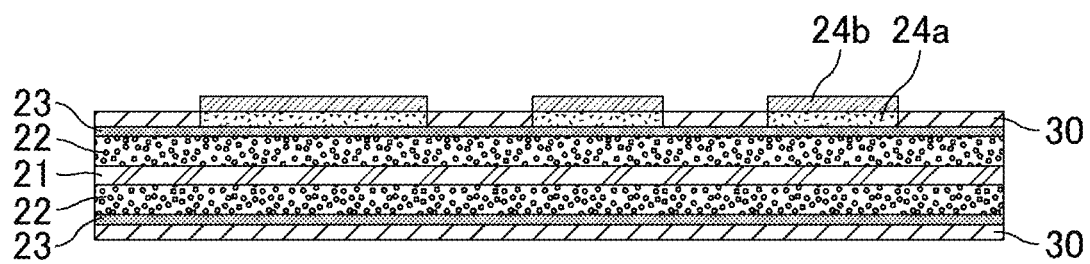
FIG. 7B is a cross-section view of the same.

FIG. 7A is a perspective view schematically illustrating an example of a step of forming the carbon layer, while FIG. 7B is a cross-section view of the same.

The carbon layer 24b is formed on the solid electrolyte layer 24a. For example, the carbon layer can be formed by applying and drying a conductive adhesive paste containing a carbon filler.

FIG. 8A is a perspective view schematically illustrating an example of a step of forming the copper layer, while FIG. 8B is a cross-section view of the same.

The copper layer 24c is formed on the carbon layer 24b. As a result, the cathode layer 24 including the solid electrolyte layer 24a, the carbon layer 24b, and the copper layer 24c is formed on the dielectric layer 23. For example, the copper layer may be formed using a conductive adhesive paste containing a copper filler, or may be formed by a copper plating process.

As above, there is obtained a solid electrolytic capacitor sheet 100 having the anode plate 21, the porous layer 22 provided on at least one main surface of the anode plate 21, the dielectric layer 23 provided on the surface of the porous layer 22, and the cathode layer 24 provided on the surface of the dielectric layer 23. As illustrated in FIG. 8B, the solid electrolytic capacitor sheet 100 has the first main surface S1 and the second main surface S2 which oppose each other in the thickness direction.

Figure 9A:
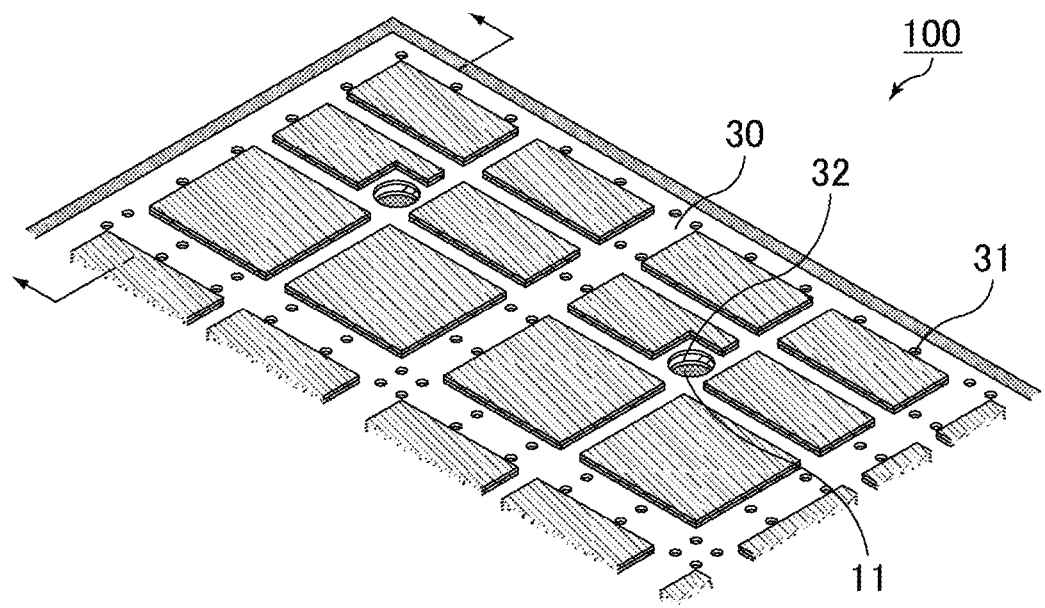
Figure 9B:
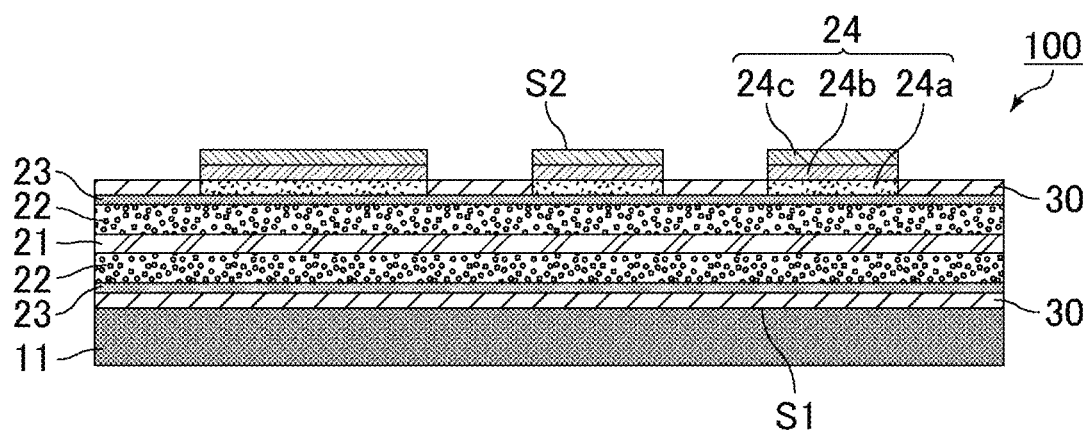
FIG. 9B is a cross-section view of the same.

Next, as illustrated in FIGS. 9A and 9B, the sheet-shaped first sealing layer is disposed on the first main surface side of the solid electrolytic capacitor sheet.

FIG. 9A is a perspective view schematically illustrating an example of a step of disposing the first sealing layer, while FIG. 9B is a cross-section view of the same.

The first sealing layer 11 is disposed on the first main surface S1 side of the solid electrolytic capacitor sheet 100. For example, a sheet containing an insulating resin is stuck to the solid electrolytic capacitor sheet. The first sealing layer 11 may also penetrate a portion of the through-holes 31 and 32.

Figure 10A:
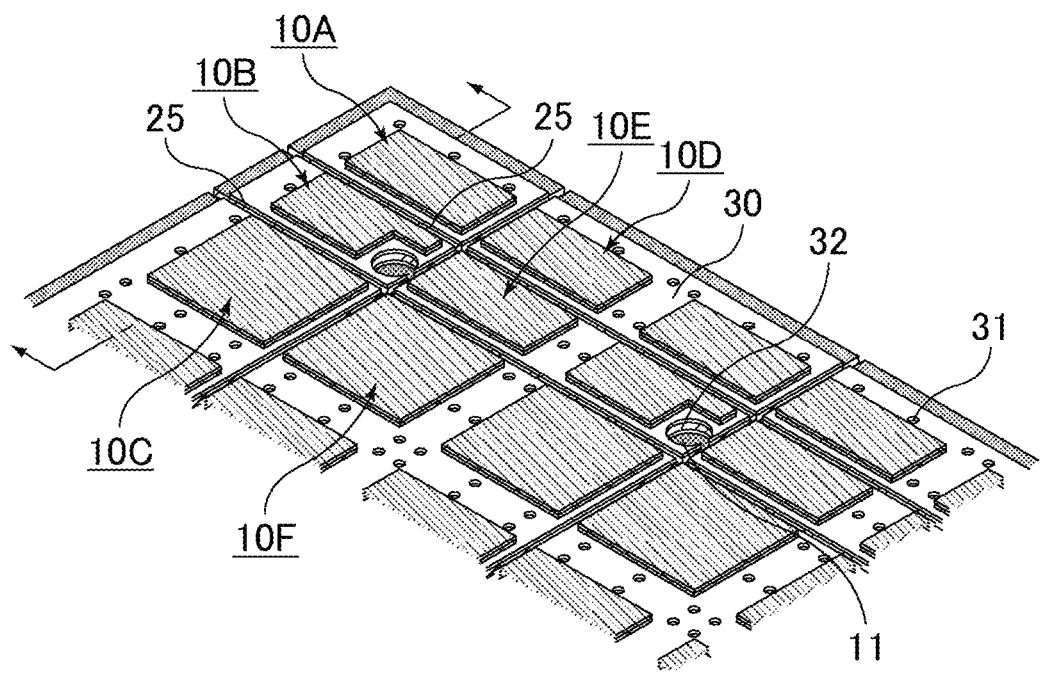
Figure 10B:
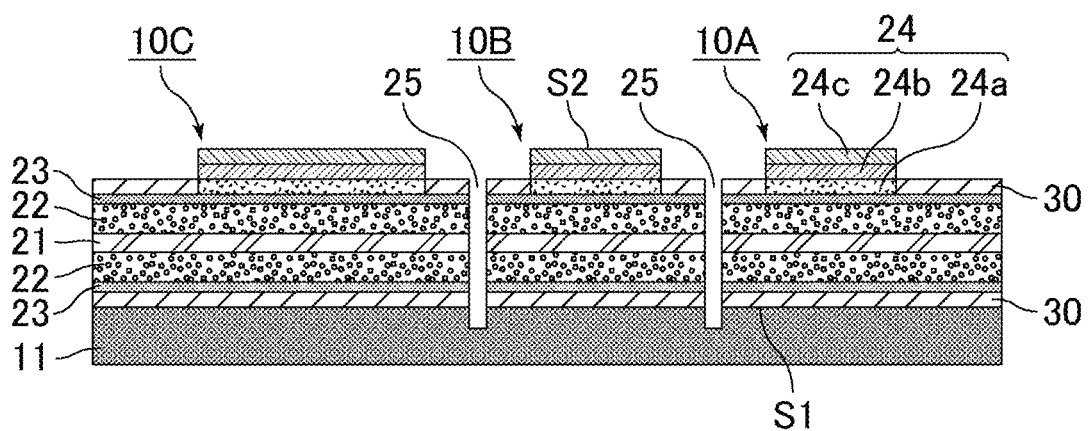
FIG. 10B is a cross-section view of the same.

Next, as illustrated in FIGS. 10A and 10B, the solid electrolytic capacitor sheet is partitioned into a plurality of solid electrolytic capacitor elements disposed on the first sealing layer by cutting the solid electrolytic capacitor sheet in the thickness direction from the second main surface side. Examples of the cutting method include laser processing and dicing.

FIG. 10A is a perspective view schematically illustrating an example of a step of cutting a solid electrolytic capacitor sheet, while FIG. 10B is a cross-section view of the same.

The solid electrolytic capacitor sheet 100 is cut in the thickness direction from the second main surface S2 side while treating the first sealing layer 11 on the first main surface S1 side as a support. At this time, a portion of the first sealing layer 11 is also cut preferably. With this arrangement, the solid electrolytic capacitor sheet 100 is partitioned into the solid electrolytic capacitor elements 10A, 10B, 10C, 10D, 10E, and 10F by the slit-shaped sheet removal part 25 while remaining disposed on the first sealing layer 11. Strictly speaking, as illustrated in FIG. 10A, the solid electrolytic capacitor sheet is not partitioned into the solid electrolytic capacitor elements in the areas where the capacitor array units are adjacent to each other, but a single capacitor array unit can be considered to be partitioned into the solid electrolytic capacitor elements 10A, 10B, 10C, 10D, 10E, and 10F.

The width of the sheet removal part is not limited, but is preferably 15 μm to 500 μm, more preferably 15 μm to 200 μm, even more preferably 30 μm to 200 μm, most preferably 50 μm to 150 μm.

The aspect ratio of the sheet removal part, namely the ratio of the length versus the width, is preferably 10 to 1000, and more preferably 100 to 1000.

Figure 11:
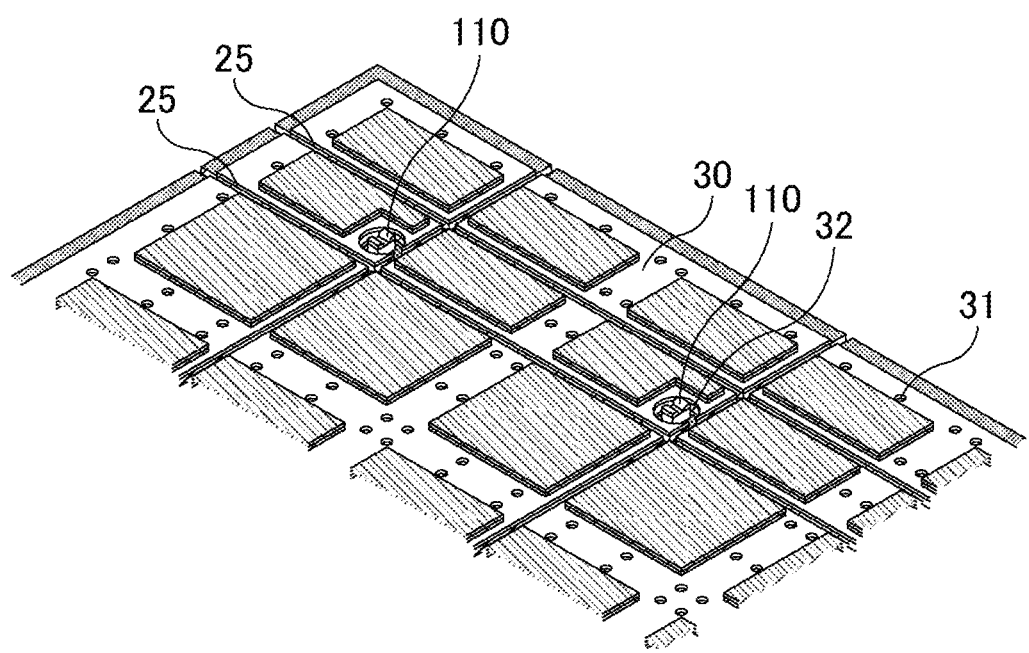
FIG. 11 is a perspective view schematically illustrating an example of a step of disposing a different type of capacitor element from the solid electrolytic capacitor elements.

FIG. 11 is a perspective view schematically illustrating an example of a step of disposing a different type of capacitor element from the solid electrolytic capacitor elements.

As illustrated in FIG. 11, a capacitor element 110 of a different type from the solid electrolytic capacitor elements may be disposed in the space forming each through-hole 32. Examples of the different type of capacitor element from the solid electrolytic capacitor elements include a multilayer ceramic capacitor and a silicon capacitor.

Figure 12A:
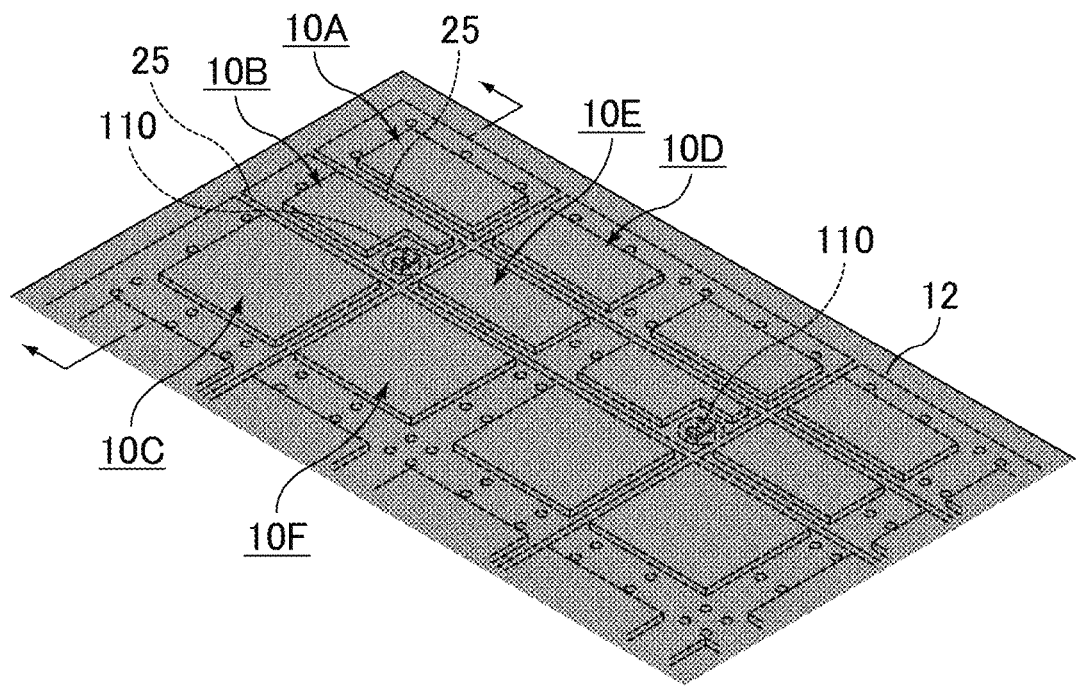
Figure 12B:
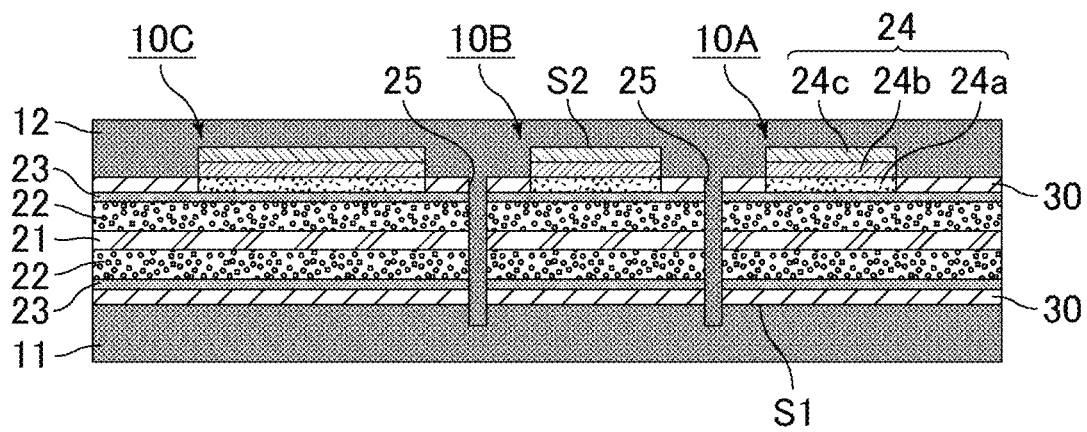
FIG. 12B is a cross-section view of the same.

Additionally, as illustrated in FIGS. 12A and 12B, the sheet-shaped second sealing layer is disposed covering the plurality of the solid electrolytic capacitor elements on the first sealing layer from the second main surface side.

FIG. 12A is a perspective view schematically illustrating an example of a step of disposing the second sealing layer, while FIG. 12B is a cross-section view of the same.

The second sealing layer 12 is disposed covering the plurality of solid electrolytic capacitor elements 10A, 10B, 10C, 10D, 10E, and 10F from the second main surface S2 side. For example, a sheet containing an insulating resin is stuck to the solid electrolytic capacitor elements. At this time, the second sealing layer 12 gets in between the anode plates 21 of adjacent solid electrolytic capacitor elements on the first sealing layer 11 proceeding toward the first main surface S1, and also penetrates a portion of the first sealing layer 11.

Figure 13A:
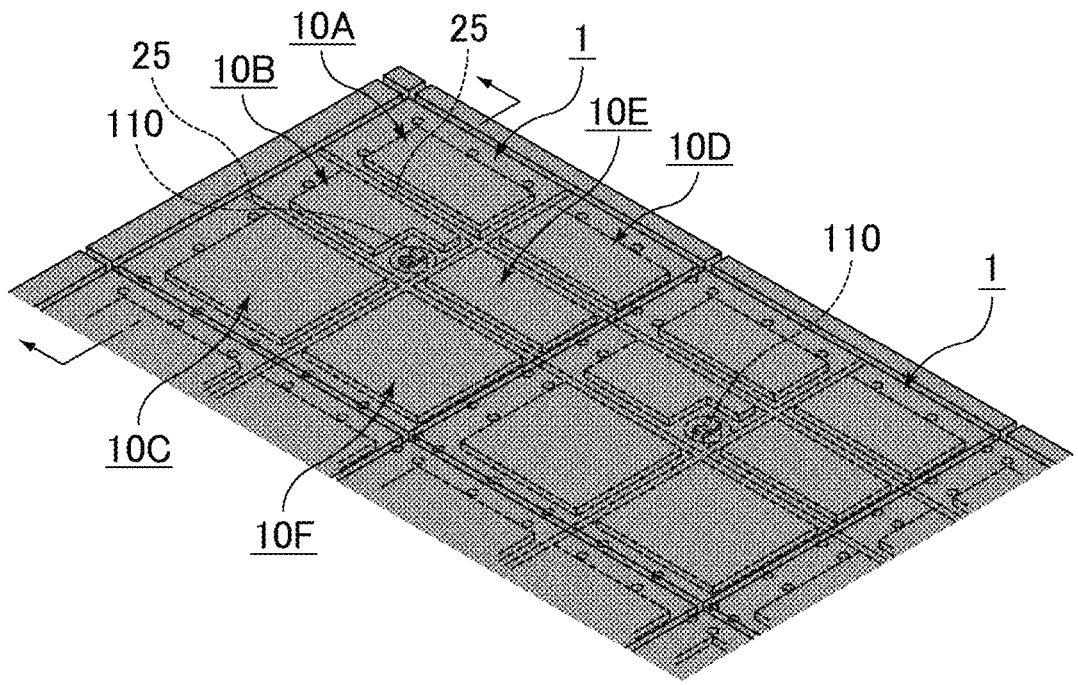
Figure 13B:
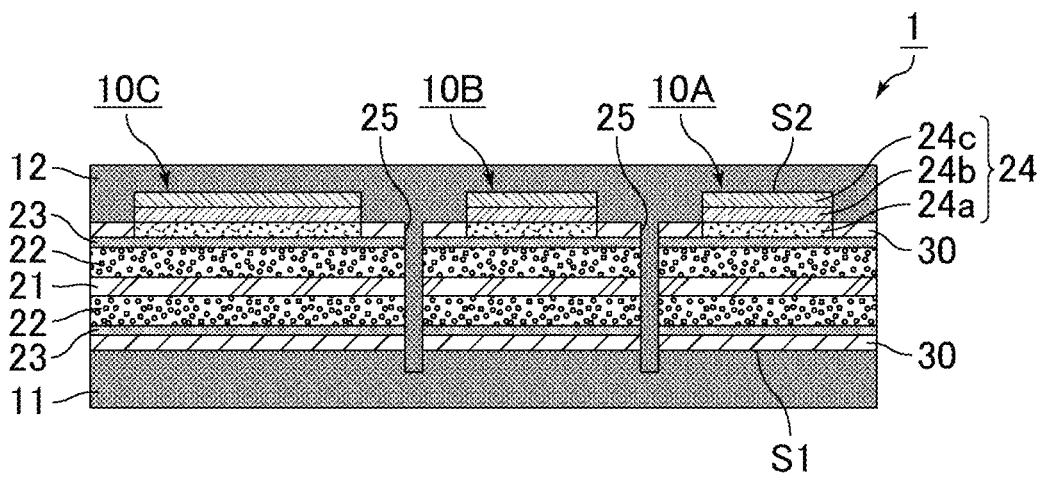
FIG. 13B is a cross-section view of the same.

FIG. 13A is a perspective view schematically illustrating an example of a step of partitioning into a plurality of capacitor arrays, while FIG. 13B is a cross-section view of the same.

As illustrated in FIGS. 13A and 13B, by cutting the sealing layers into individual capacitor array units, respective capacitor arrays 1 equipped with the solid electrolytic capacitor elements 10A, 10B, 10C, 10D, 10E, and 10F inside a single array are obtained.

In the method described above, a large chemically treated foil is used and partitioned into a plurality of capacitor arrays, but if a chemically treated foil just large enough to obtain a single capacitor array is used, the step of partitioning into capacitor arrays does not have to be performed.

In the method of manufacturing the capacitor array according to the present invention, it is preferable to dispose the second sealing layer after cutting the solid electrolytic capacitor sheet, like in the method described above. However, a partial second sealing layer may be disposed on the second main surface side, and after cutting the partial second sealing layer as well as the solid electrolytic capacitor sheet, a remaining portion of the second sealing layer may be disposed on the second main surface side.

As above, a capacitor array according to the present invention can be manufactured.

After making the capacitor array as above, it is preferable to form external electrodes connected to each of the anode plate and the cathode layer of the capacitor array on the outside of the first sealing layer or the second sealing layer of the capacitor array. For example, external electrodes that have a desired pattern can be formed by sticking a copper foil and then performing an etching treatment. Hereinafter, an external electrode connected to the anode plate will also be referred to as an anodic external electrode, while an external electrode connected to the cathode layer will also be referred to as a cathodic external electrode.

Figure 14:
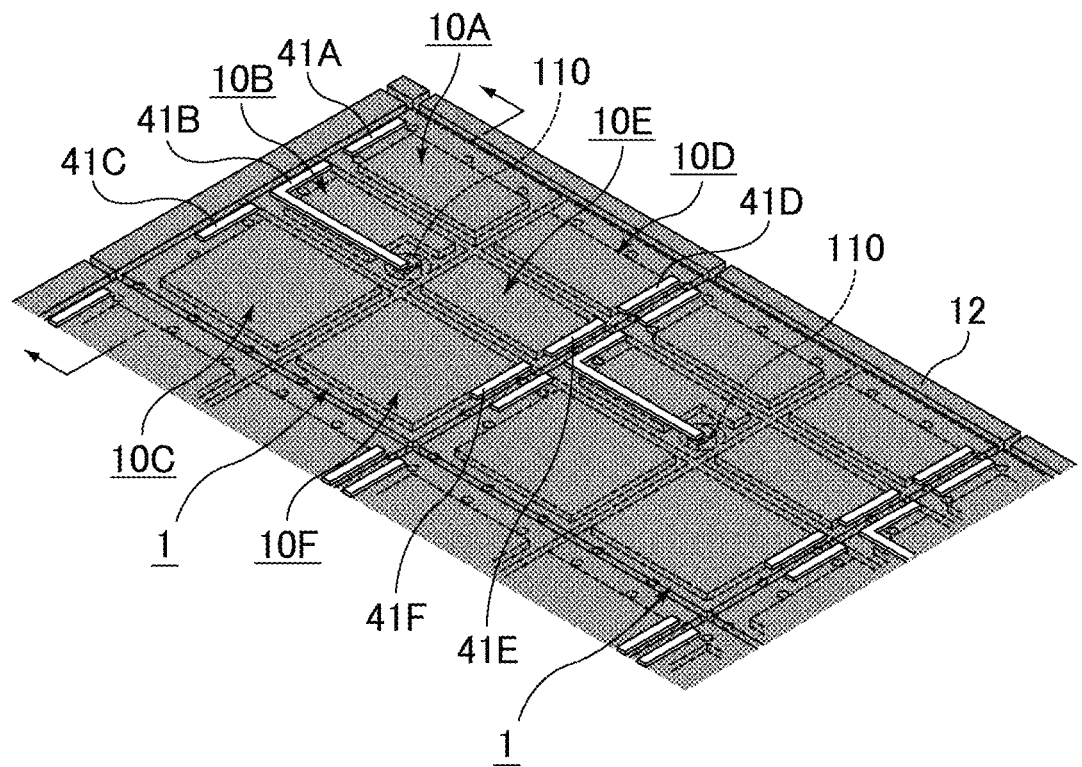
FIG. 14 is a perspective view schematically illustrating an example of a step of forming anodic external electrodes.

FIG. 14 is a perspective view schematically illustrating an example of a step of forming anodic external electrodes.

In FIG. 14, anodic external electrodes 41A, 41B, 41C, 41D, 41E, and 41F are formed with respect to each anode plate 21 on the outside of the second sealing layer 12. As illustrated in FIG. 14, the anodic external electrode 41B may also be formed to connect the solid electrolytic capacitor element 10B and the capacitor element 110 in parallel.

Figure 15:
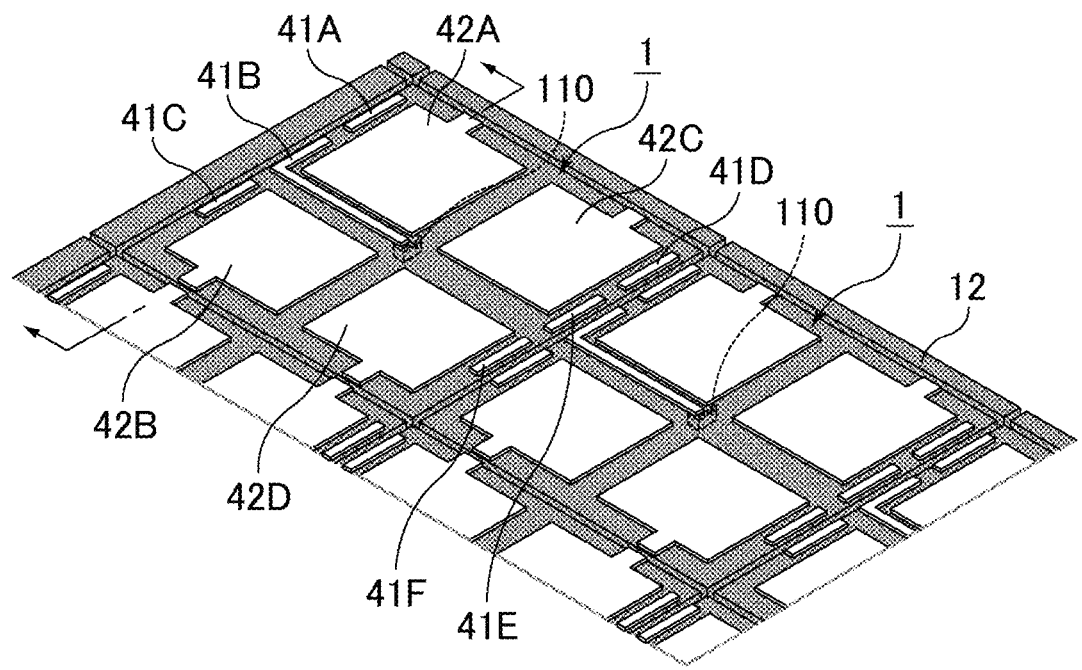
FIG. 15 is a perspective view schematically illustrating an example of a step of forming cathodic external electrodes.

FIG. 15 is a perspective view schematically illustrating an example of a step of forming cathodic external electrodes.

In FIG. 15, cathodic external electrodes 42A, 42B, 42C, and 42D are formed on the outside of the second sealing layer 12. The cathodic external electrode 42A is connected in common to the cathode layers 24 of the solid electrolytic capacitor elements 10A and 10B, while the cathodic external electrode 42C is connected in common to the cathode layers 24 of the solid electrolytic capacitor elements 10D and 10E. Note that a cathodic external electrode may also be formed with respect to each cathode layer.

Figure 16:
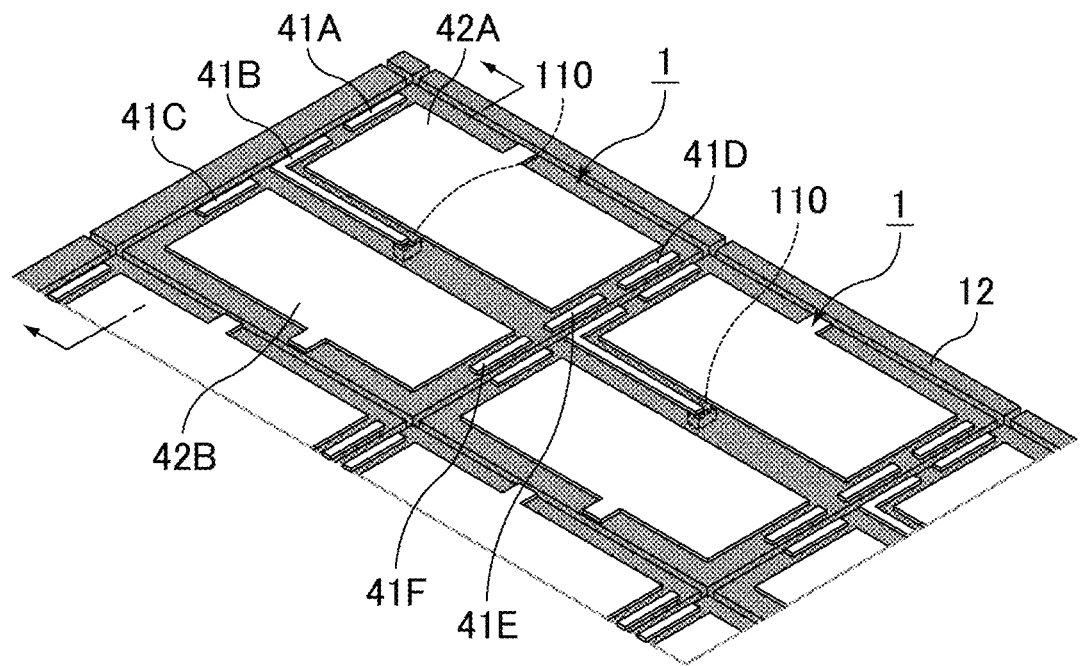
FIG. 16 is a perspective view schematically illustrating another example of a step of forming cathodic external electrodes.

FIG. 16 is a perspective view schematically illustrating another example of a step of forming cathodic external electrodes.

In FIG. 16, cathodic external electrodes 42A and 42B are formed on the outside of the second sealing layer 12. The cathodic external electrode 42A is connected in common to the cathode layers 24 of the solid electrolytic capacitor elements 10A, 10B, 10D, and 10E, while the cathodic external electrode 42B is connected in common to the cathode layers 24 of the solid electrolytic capacitor elements 10C and 10F.

Although not illustrated, through-electrodes penetrating through the second sealing layer (or the first sealing layer) in the thickness direction are preferably formed, such that the anode plate is connected to an anodic external electrode and the cathode layer is connected to a cathodic external electrode via the through-electrodes. The method of forming the through-electrodes are not limited, but include a method of performing laser via processing after forming the anodic external electrodes and the cathodic external electrodes. The through-electrodes may be formed before disposing the first sealing layer or the second sealing layer, or the through-electrodes may be formed after disposing the first sealing layer or the second sealing layer and before forming the anodic external electrodes and the cathodic external electrodes.

Figure 17:
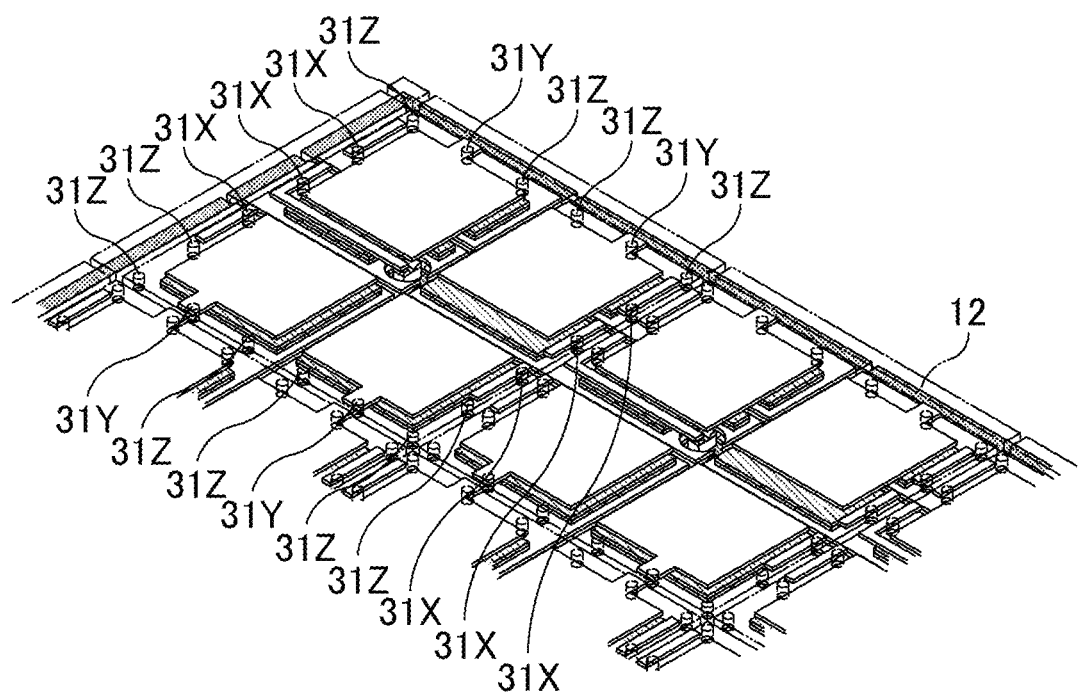
FIG. 17 is a see-through view of FIG. 15 for explaining the function of the through-holes.
Figure 18:
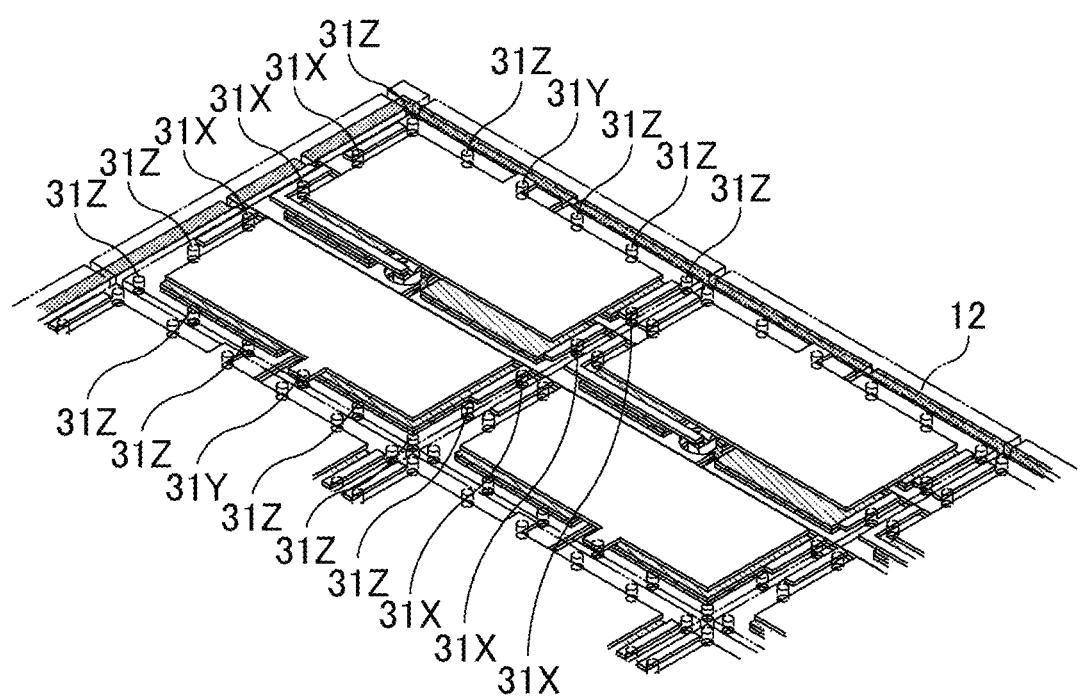
FIG. 18 is a see-through view of FIG. 16 for explaining the function of the through-holes.

FIG. 17 is a see-through view of FIG. 15 for explaining the function of the through-holes. FIG. 18 is a see-through view of FIG. 16 for explaining the function of the through-holes.

In FIGS. 17 and 18, through-holes 31X are used to connect the anode plate to an external electrode, while through-holes 31Y are used to connect the cathode layer to an external electrode. Also, through-holes 31Z are used to connect components other than capacitors.

Note that the anodic external electrodes and the cathodic external electrodes may be formed at the same time or separately.

Hereinafter, a modification of the anode and cathode structure will be described with reference to the drawings. In the following drawings, only the characteristic configuration is illustrated, and the configuration of features such as the dielectric layer, the solid electrolyte layer, and the insulating layer is omitted from illustration.

Figure 19A:
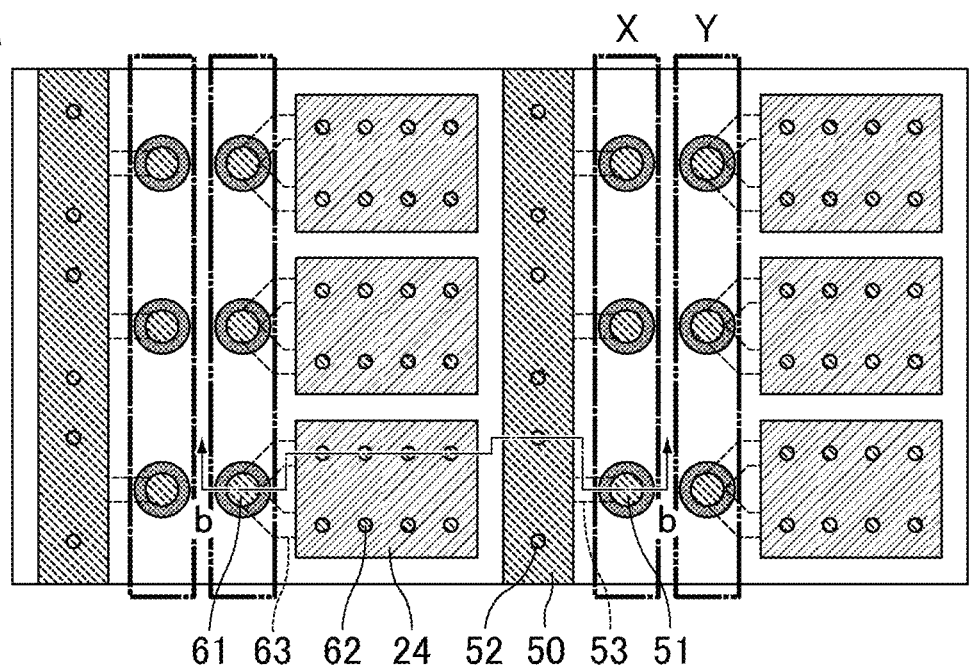
Figure 19B:
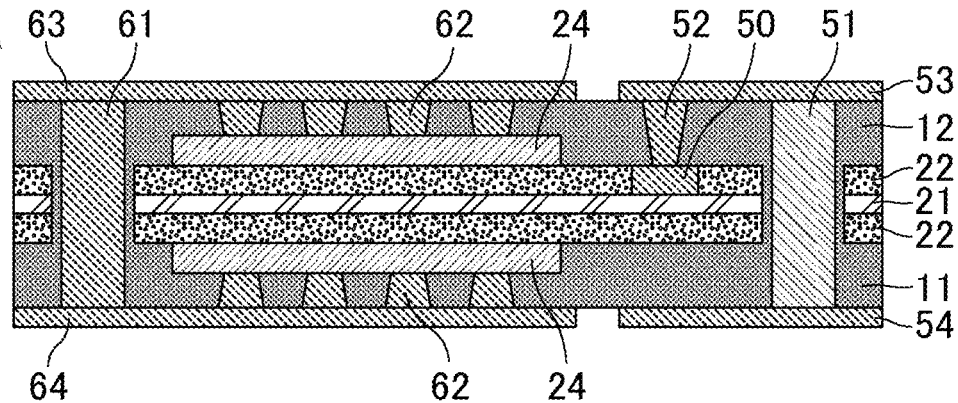
FIG. 19B is a projected cross-section view along the line b-b in FIG. 19A.

FIG. 19A is a projected plan view viewing a first modification of the anode and cathode structure from the second sealing layer side, while FIG. 19B is a projected cross-section view along the line b-b in FIG. 19A.

A capacitor array 1A illustrated in FIGS. 19A and 19B includes a line conductor 50, anodic through-electrodes 51 that penetrate through the first sealing layer 11 and the second sealing layer 12 in the thickness direction, anodic via conductors 52 that penetrate through the second sealing layer 12 in the thickness direction, an anode interconnect pattern 53 provided on the outside of the second sealing layer 12, and an anode interconnect pattern 54 provided on the outside of the first sealing layer 11. In the capacitor array 1A illustrated in FIGS. 19A and 19B, a portion of the porous layer 22 is removed in a line, and the line conductor 50 is provided in the removed portion. Additionally, the anodic via conductors 52 are provided directly on the line conductor 50, and the anode interconnect pattern 53 is provided directly on the anodic via conductors 52. Through the line conductor 50, the anodic via conductors 52, and the anode interconnect pattern 53, the anode plate 21 is electrically connected to the anodic through-electrodes 51.

The capacitor array 1A illustrated in FIGS. 19A and 19B further includes cathodic through-electrodes 61 that penetrate through the first sealing layer 11 and the second sealing layer 12 in the thickness direction, cathodic via conductors 62 that penetrate through the second sealing layer 12 in the thickness direction, a cathode interconnect pattern 63 provided on the outside of the second sealing layer 12, and a cathode interconnect pattern 64 provided on the outside of the first sealing layer 11. The cathodic via conductors 62 are provided directly on the cathode layer 24, and the cathode interconnect pattern 63 is provided directly on the cathodic via conductors 62. Through the cathodic via conductors 62 and the cathode interconnect pattern 63, the cathode layer 24 is electrically connected to the cathodic through-electrodes 61.

As illustrated in FIG. 19A, anodes X and cathodes Y are preferably disposed in alternating lines.

Figure 20A:
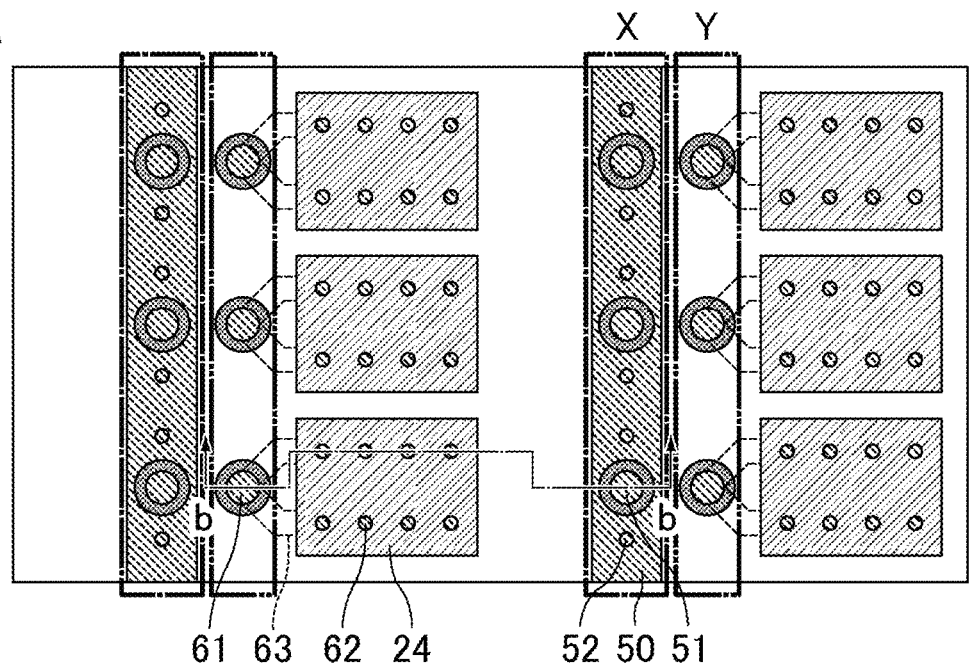
Figure 20B:
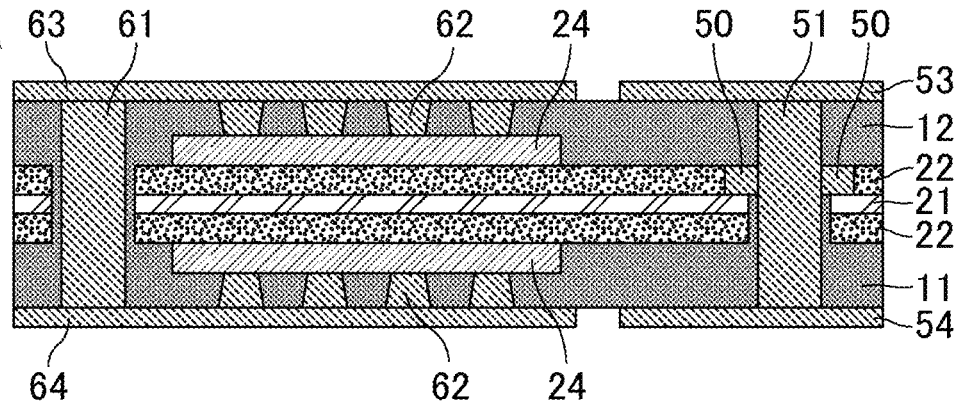
FIG. 20B is a projected cross-section view along the line b-b in FIG. 20A.

FIG. 20A is a projected plan view viewing a second modification of the anode and cathode structure from the second sealing layer side, while FIG. 20B is a projected cross-section view along the line b-b in FIG. 20A.

A capacitor array 1B illustrated in FIGS. 20A and 20B has a configuration similar to the capacitor array 1A illustrated in FIGS. 19A and 19B, except that the line conductor 50 is disposed on the same line as the anodic through-electrodes 51. In FIG. 20A, the anode interconnect pattern 53 is omitted, and in FIG. 20B, the anodic via conductors 52 are omitted.

As illustrated in FIG. 20A, the anodes X and the cathodes Y are preferably disposed in alternating lines.

Figure 21A:
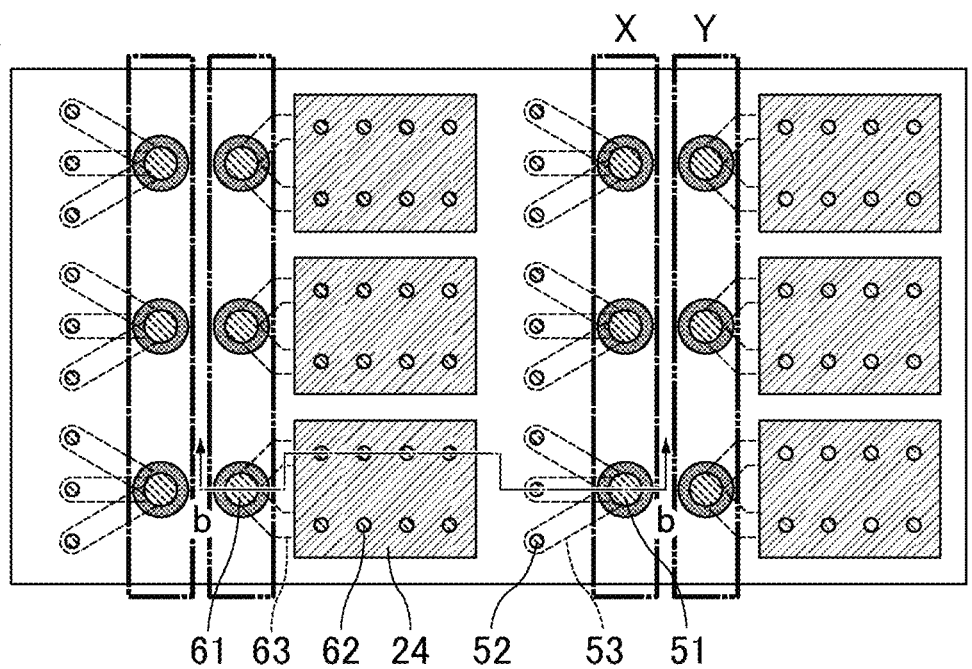
Figure 21B:
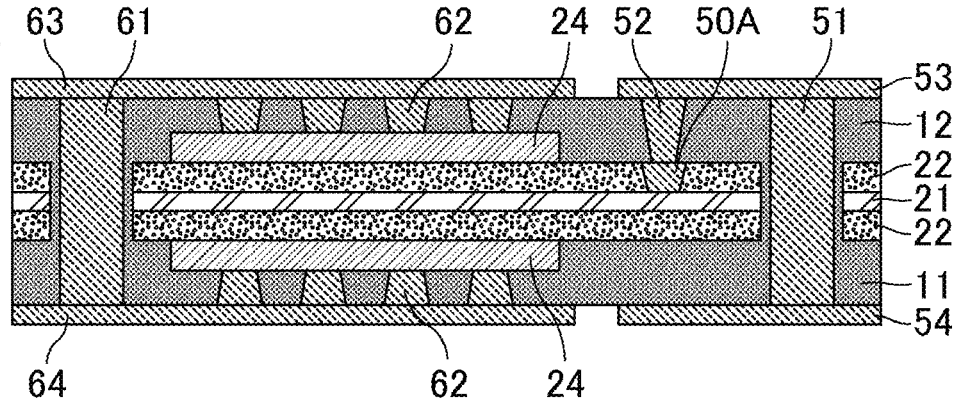
FIG. 21B is a projected cross-section view along the line b-b in FIG. 21A.

FIG. 21A is a projected plan view viewing a third modification of the anode and cathode structure from the second sealing layer side, while FIG. 21B is a projected cross-section view along the line b-b in FIG. 21A.

A capacitor array 1C illustrated in FIGS. 21A and 21B has a configuration similar to the capacitor array 1A illustrated in FIGS. 19A and 19B, except that a via conductor 50A is provided instead of the line conductor 50. In the capacitor array 1C illustrated in FIGS. 21A and 21B, an opening is formed in a portion of the porous layer 22, and the via conductor 50A is provided in the opening. In the capacitor array 1C illustrated in FIGS. 21A and 21B, more space can be saved compared to the capacitor array 1A illustrated in FIGS. 19A and 19B.

As illustrated in FIG. 21A, the anodes X and the cathodes Y are preferably disposed in alternating lines.

Figure 22A:
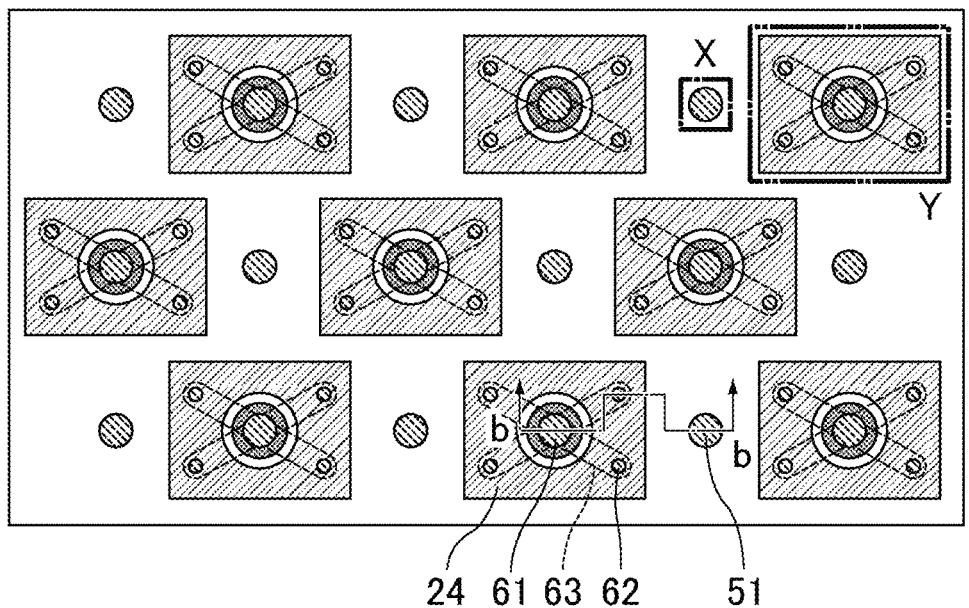
Figure 22B:
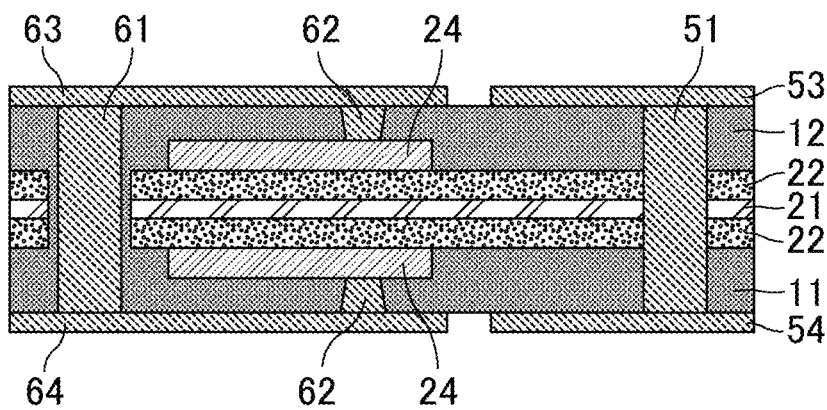
FIG. 22B is a projected cross-section view along the line b-b in FIG. 22A.

FIG. 22A is a projected plan view viewing a fourth modification of the anode and cathode structure from the second sealing layer side, while FIG. 22B is a projected cross-section view along the line b-b in FIG. 22A.

In a capacitor array 1D illustrated in FIGS. 22A and 22B, the anode plate 21 is connected directly on the wall face of the anodic through-electrodes 51. For this reason, more space can be saved in the capacitor array 1D illustrated in FIGS. 22A and 22B.

As illustrated in FIG. 22A, the anodes X and the cathodes Y are preferably disposed in a staggered lattice.

As above, in the capacitor array according to the present invention, it is possible to arrange the anodes and cathodes in alternating lines or in a staggered lattice as viewed from the first sealing layer side or the second sealing layer side.

Also, in the capacitor array according to the present invention, the anodes may be led out and connected to the anodic through-electrodes from either the main surface direction or the end face direction.

As described above, when manufacturing the capacitor array according to the present invention, examples of the method of cutting the solid electrolytic capacitor sheet include laser processing and dicing. Among these, by cutting the solid electrolytic capacitor sheet using laser processing, the solid electrolytic capacitor elements can be formed in freely desired shapes. For this reason, configurations such as disposing two or more types of solid electrolytic capacitor elements having capacitance parts with different surface areas in a single capacitor array, disposing the sheet removal part to not extend over the entire capacitor array, and disposing solid electrolytic capacitor elements whose capacitance parts have a non-rectangular planar shape become possible.

Figure 23:
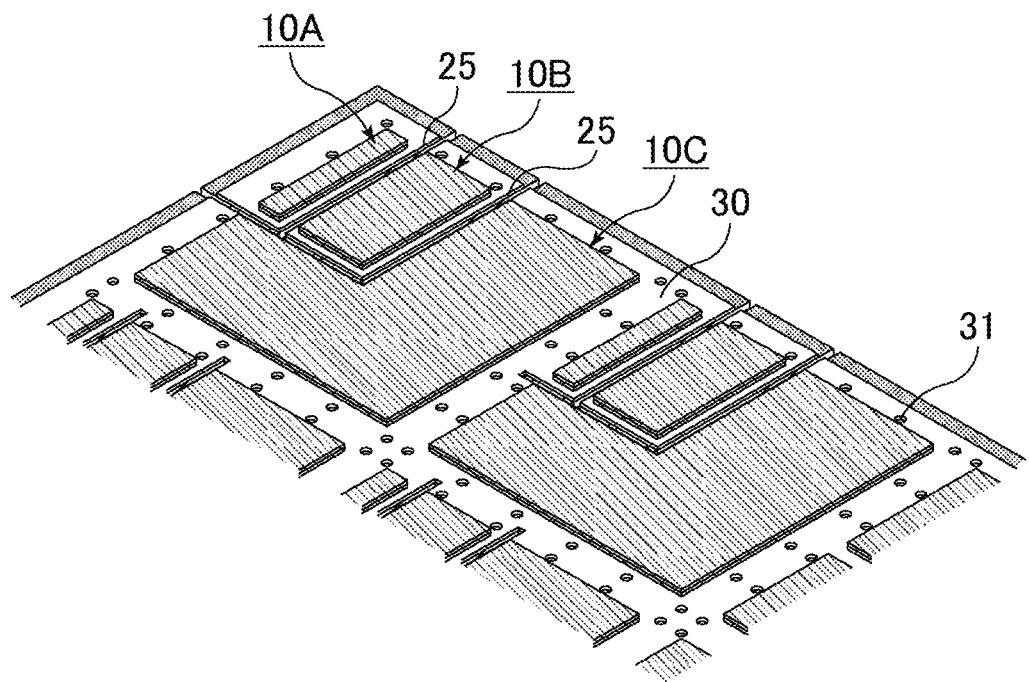
FIG. 23 is a perspective view schematically illustrating another example of a step of cutting the solid electrolytic capacitor sheet.

FIG. 23 is a perspective view schematically illustrating another example of a step of cutting the solid electrolytic capacitor sheet.

In FIG. 23, the shapes of the partitioned solid electrolytic capacitor elements are different from FIG. 10A. In the example illustrated in FIG. 23, three types of solid electrolytic capacitor elements 10A, 10B, and 10C having capacitance parts with different surface areas are partitioned by the sheet removal part 25. In FIG. 23, the solid electrolytic capacitor element 10C is disposed on the extension of the sheet removal part 25 demarcating the solid electrolytic capacitor elements 10A and 10B.

In this way, in the capacitor array according to the present invention, at least a portion of the sheet removal part may be disposed to not extend over the entire capacitor array.

In the capacitor array according to the present invention, at least one solid electrolytic capacitor element may also be disposed on the extension of the sheet removal part.

The capacitor array according to the present invention may include two or more types of solid electrolytic capacitor elements having capacitance parts with different surface areas.

The capacitor array according to the present invention may include a solid electrolytic capacitor element whose capacitance part has a non-rectangular planar shape. In this specification, "rectangular" means a square shape or an oblong shape. Consequently, the capacitor array according to the present invention may include a solid electrolytic capacitor element whose capacitance part has a planar shape that is a non-rectangular quadrilateral shape, a polygonal shape such as triangular, pentagonal, or hexagonal, a shape having a curved part, a circular shape, an elliptical shape, or the like. In this case, two or more types of solid electrolytic capacitor elements whose capacitance parts have different planar shapes may also be included. Also, in addition to the solid electrolytic capacitor element whose capacitance part has a non-rectangular planar shape, a solid electrolytic capacitor element whose capacitance part has a rectangular planar shape may or may not be included.

Figure 24:
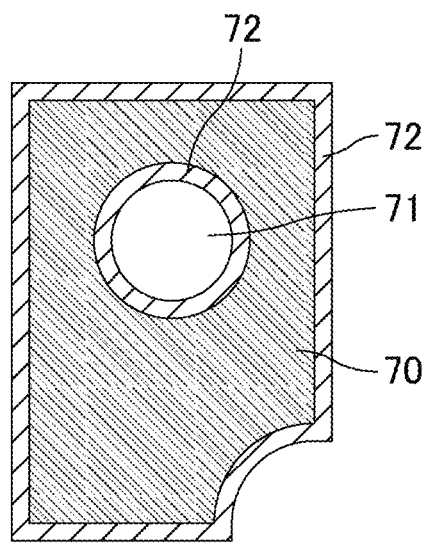
FIG. 24 is a plan view schematically illustrating an example of a capacitance part having a non-rectangular planar shape.

FIG. 24 is a plan view schematically illustrating an example of a capacitance part having a non-rectangular planar shape.

A capacitance part 70 illustrated in FIG. 24 has a non-rectangular outer shape, and a through-hole 71 is formed internally. The through-electrode described above can be formed on the inner side of the through-hole 71. In FIG. 24, an insulating part 72 is provided on the outer and inner walls of the capacitance part 70.

As described above, the capacitor array according to the present invention additionally may include a stress relaxation layer between the solid electrolytic capacitor element and the first sealing layer or the second sealing layer. In this case, it is sufficient to provide the stress relaxation layer in at least one of between the solid electrolytic capacitor elements and the first sealing layer or between the solid electrolytic capacitor elements and the second sealing layer.

In the case of the capacitor array according to the present invention includes the stress relaxation layer, the stress relaxation layer may also be provided inside the sheet removal part. In other words, the stress relaxation layer may also be provided between neighboring solid electrolytic capacitor elements.

By providing the stress relaxation layer in the above locations, stress occurring between the inside and the outside of the capacitor array can be relaxed without impairing the performance required of each of the conducting parts and the insulating parts disposed on the outermost parts of the solid electrolytic capacitor elements (such as the resistance and block performance) and the performance required of the sealing layers (such as how easily the sealing layers adhere to interconnects and how easily the sealing layers are smoothly formed). In particular, in cases such as where the in-plane layout is different (for example, the case where the shapes of the solid electrolytic capacitor elements are asymmetric in the main surface or on one main surface and the other main surface), stress in the surface direction can also be relaxed by providing the stress relaxation layer such that the thermal characteristics are partially different.

Figure 25:
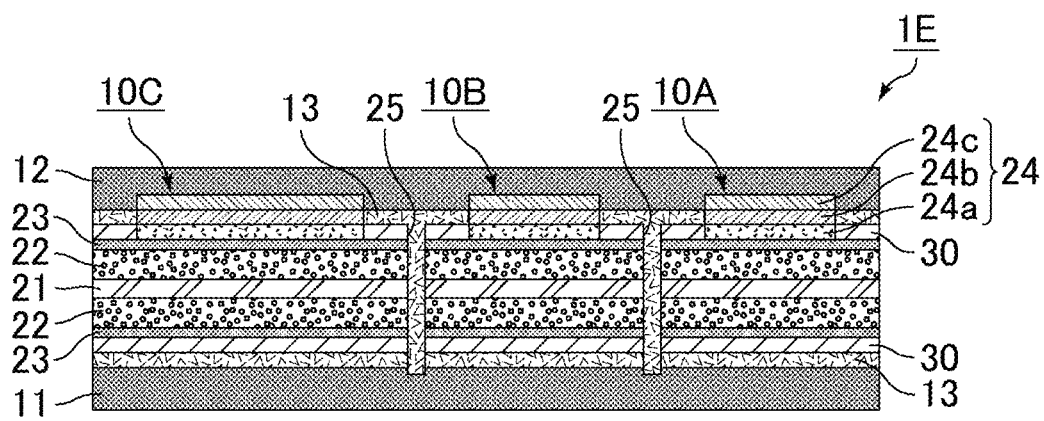
FIG. 25 is a cross-section view schematically illustrating an example of a capacitor array including a stress relaxation layer.
Figure 26:
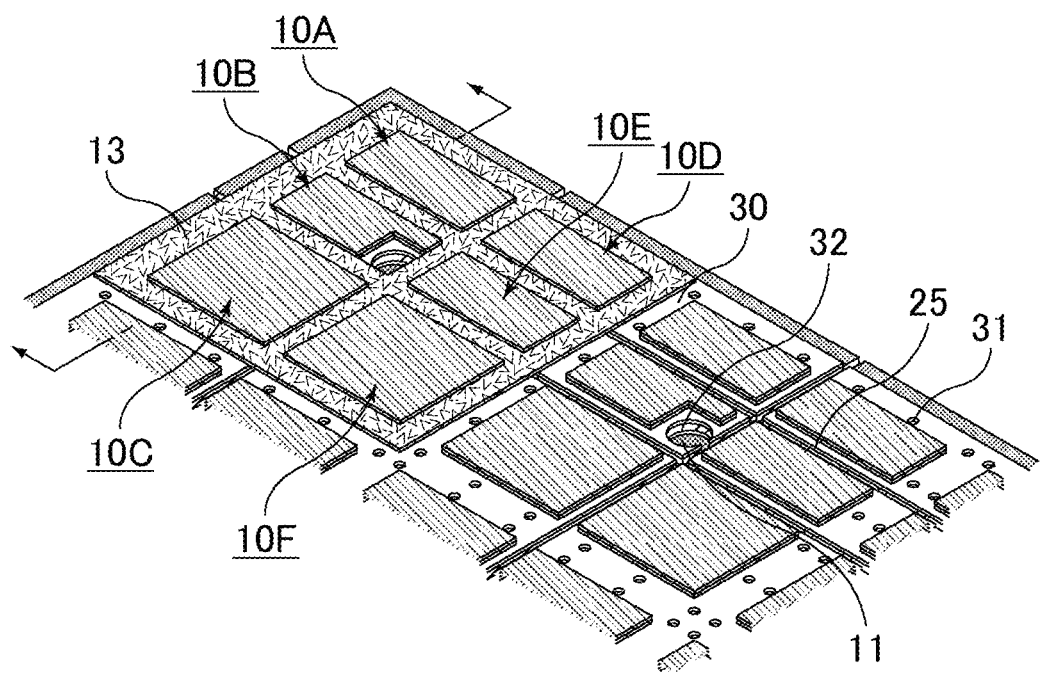
FIG. 26 is a perspective view schematically illustrating an example of a solid electrolytic capacitor sheet for manufacturing the capacitor array illustrated in FIG. 25.

FIG. 25 is a cross-section view schematically illustrating an example of a capacitor array including a stress relaxation layer. FIG. 26 is a perspective view schematically illustrating an example of a solid electrolytic capacitor sheet for manufacturing the capacitor array illustrated in FIG. 25. In FIG. 26, the stress relaxation layer is provided in only one capacitor array for the sake of convenience. Also, FIG. 25 corresponds to a cross-section along the arrow in the solid electrolytic capacitor sheet illustrated in FIG. 26.

A capacitor array 1E illustrated in FIG. 25 includes a stress relaxation layer 13 between the solid electrolytic capacitor elements 10A, 10B, or 10C and the first sealing layer 11, and also between the solid electrolytic capacitor elements 10A, 10B, or 10C and the second sealing layer 12. In the capacitor array 1E illustrated in FIG. 25, the stress relaxation layer 13 is provided covering the entirety of the insulating layer 30. Furthermore, the sheet removal part 25 is also filled with the stress relaxation layer 13.

Although not illustrated in FIG. 26, the stress relaxation layer 13 is also provided between the solid electrolytic capacitor elements 10D, 10E, or 10F and the first sealing layer 11. Also, by disposing the second sealing layer 12 from the state illustrated in FIG. 26, the stress relaxation layer 13 is also provided between the solid electrolytic capacitor elements 10D, 10E, or 10F and the second sealing layer 12. The through-holes 31 illustrated in FIG. 26 may or may not be filled with the stress relaxation layer 13.

Figure 27:
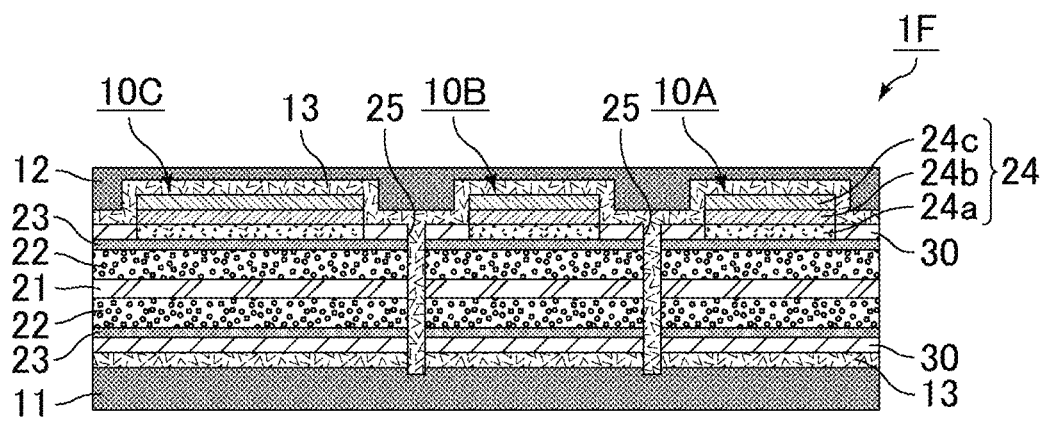
FIG. 27 is a cross-section view schematically illustrating another example of a capacitor array including a stress relaxation layer.
Figure 28:
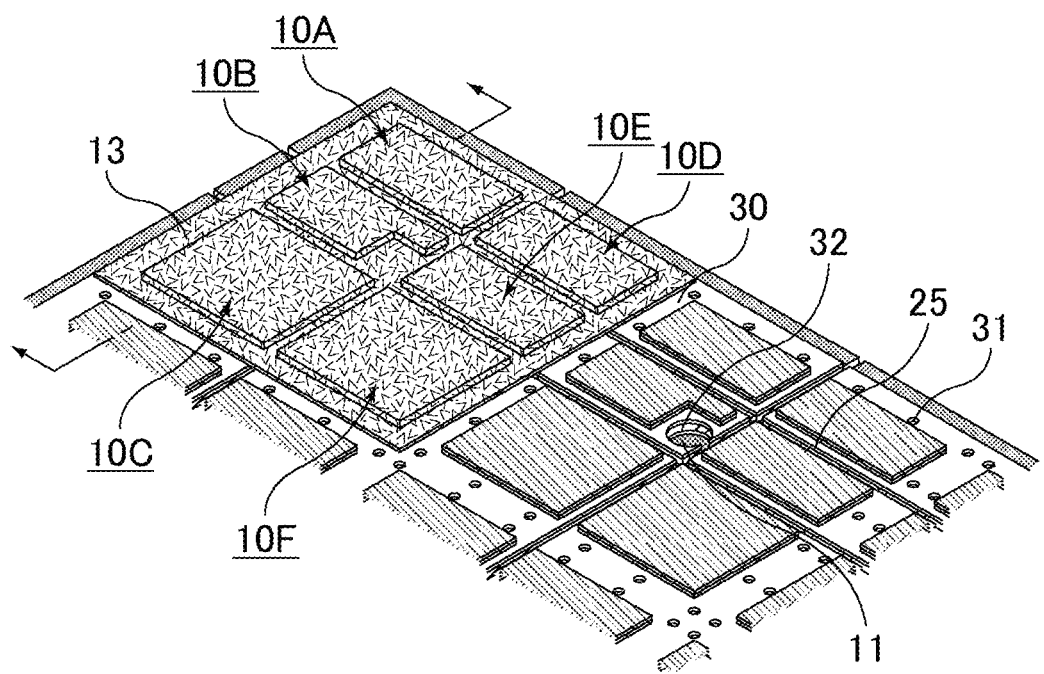
FIG. 28 is a perspective view schematically illustrating an example of a solid electrolytic capacitor sheet for manufacturing the capacitor array illustrated in FIG. 27.

FIG. 27 is a cross-section view schematically illustrating another example of a capacitor array including a stress relaxation layer. FIG. 28 is a perspective view schematically illustrating an example of a solid electrolytic capacitor sheet for manufacturing the capacitor array illustrated in FIG. 27. In FIG. 28, the stress relaxation layer is provided in only one capacitor array for the sake of convenience. Also, FIG. 27 corresponds to a cross-section along the arrow in the solid electrolytic capacitor sheet illustrated in FIG. 28.

A capacitor array 1F illustrated in FIG. 27 includes a stress relaxation layer 13 between the solid electrolytic capacitor elements 10A, 10B, or 10C and the first sealing layer 11, and also between the solid electrolytic capacitor elements 10A, 10B, or 10C and the second sealing layer 12. In the capacitor array 1F illustrated in FIG. 27, the stress relaxation layer 13 is provided covering not only the entirety of the insulating layer 30, but also the entirety of the solid electrolytic capacitor elements 10A, 10B, and 10C. Furthermore, the sheet removal part 25 is also filled with the stress relaxation layer 13.

Although not illustrated in FIG. 28, the stress relaxation layer 13 is also provided between the solid electrolytic capacitor elements 10D, 10E, or 10F and the first sealing layer 11. Also, by disposing the second sealing layer 12 from the state illustrated in FIG. 28, the stress relaxation layer 13 is also provided between the solid electrolytic capacitor elements 10D, 10E, or 10F and the second sealing layer 12. The through-holes 31 illustrated in FIG. 28 may or may not be filled with the stress relaxation layer 13.

Figure 29:
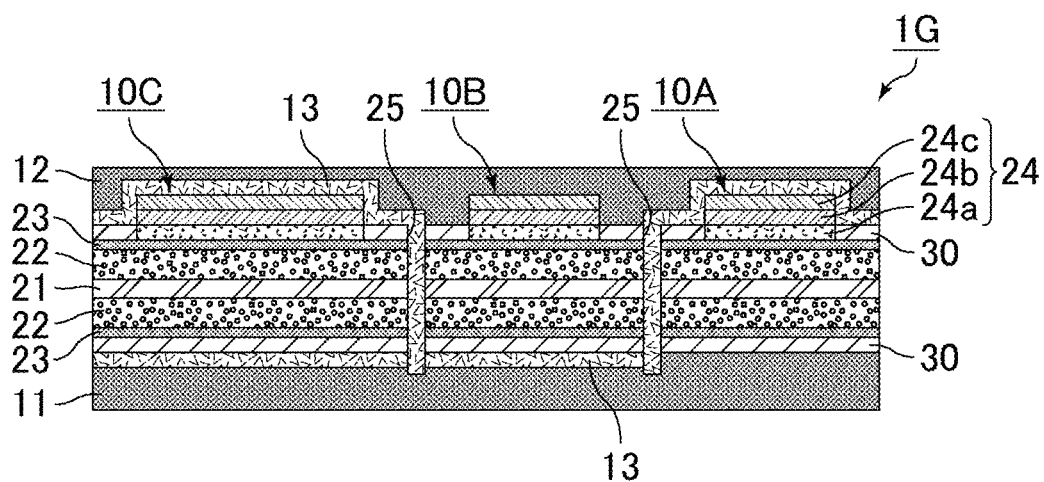
FIG. 29 is a cross-section view schematically illustrating yet another example of a capacitor array including a stress relaxation layer.
Figure 30:
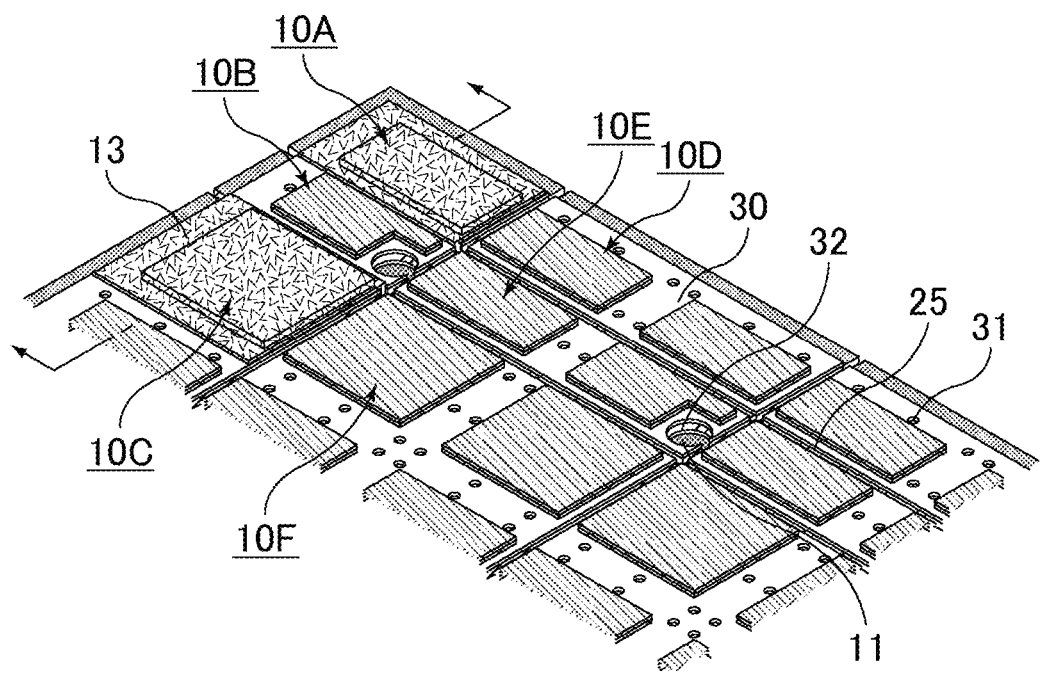
FIG. 30 is a perspective view schematically illustrating an example of a solid electrolytic capacitor sheet for manufacturing the capacitor array illustrated in FIG. 29.

FIG. 29 is a cross-section view schematically illustrating yet another example of a capacitor array including a stress relaxation layer. FIG. 30 is a perspective view schematically illustrating an example of a solid electrolytic capacitor sheet for manufacturing the capacitor array illustrated in FIG. 29. In FIG. 30, the stress relaxation layer is provided in only one capacitor array for the sake of convenience. Also, FIG. 29 corresponds to a cross-section along the arrow in the solid electrolytic capacitor sheet illustrated in FIG. 30.

In FIG. 29, the stress relaxation layer 13 is provided in only a portion of a capacitor array 1G. The capacitor array 1G illustrated in FIG. 29 includes the stress relaxation layer 13 between the solid electrolytic capacitor elements 10B or 10C and the first sealing layer 11, and also between the solid electrolytic capacitor elements 10A or 10C and the second sealing layer 12. Furthermore, the sheet removal part 25 is also filled with the stress relaxation layer 13.

Although not illustrated in FIG. 30, the stress relaxation layer 13 also may or may not be provided between at least one of the solid electrolytic capacitor elements 10D, 10E, or 10F and the first sealing layer 11. The stress relaxation layer 13 also may or may not be provided between at least one of the solid electrolytic capacitor elements 10D, 10E, or 10F and the second sealing layer 12. The through-holes 31 illustrated in FIG. 30 may or may not be filled with the stress relaxation layer 13.

For example, in the case where the shapes of the solid electrolytic capacitor elements are asymmetric in the main surface or on one main surface and the other main surface, by providing the stress relaxation layer 13 in only a portion of the capacitor array like the capacitor array 1G illustrated in FIG. 29, the thermal stress on the capacitor array as a whole can be balanced.

In the capacitor array according to the present invention, the stress relaxation layer preferably contains an insulating resin. Examples of the insulating resin contained in the stress relaxation layer include an epoxy resin, a phenol resin, and a silicone resin. The stress relaxation layer preferably further contains a filler. Examples of the filler contained in the stress relaxation layer include an inorganic filler such as silica particles, alumina particles, or metal particles. The insulating resin contained in the stress relaxation layer is preferably different from the resin contained in the first sealing layer and the second sealing layer.

Because properties such as adhesion with external electrodes as exterior bodies are demanded of the first sealing layer and the second sealing layer, it is difficult to unconditionally select a resin that matches the coefficient of linear expansion of the solid electrolytic capacitor elements or has a freely chosen elastic modulus. In contrast, by providing the stress relaxation layer, the thermal stress design can be adjusted without impairing the respective functions of the solid electrolytic capacitor elements, the first sealing layer, and the second sealing layer.

The stress relaxation layer preferably has a lower moisture permeability than at least one of the first sealing layer or the second sealing layer. In this case, the intrusion of moisture into the solid electrolytic capacitor elements can be reduced in addition to adjusting the stress. The moisture permeability of the stress relaxation layer can be adjusted by factors such as the type of insulating resin contained in the stress relaxation layer and the amount of filler contained in the stress relaxation layer.

In the capacitor array according to the present invention, in the case where the stress relaxation layer is provided between the solid electrolytic capacitor elements and the first sealing layer, it is sufficient to provide the stress relaxation layer between at least one of the solid electrolytic capacitor elements and the first sealing layer. The stress relaxation layer may be provided between all of the solid electrolytic capacitor elements and the first sealing layer, or locations where the stress relaxation layer is not provided between one or more solid electrolytic capacitor elements and the first sealing layer may exist.

In the capacitor array according to the present invention, in the case where the stress relaxation layer is provided between the solid electrolytic capacitor elements and the second sealing layer, it is sufficient to provide the stress relaxation layer between at least one of the solid electrolytic capacitor elements and the second sealing layer. The stress relaxation layer may be provided between all of the solid electrolytic capacitor elements and the second sealing layer, or locations where the stress relaxation layer is not provided between one or more solid electrolytic capacitor elements and the second sealing layer may exist.

In the capacitor array according to the present invention, in the case where the stress relaxation layer is provided between the solid electrolytic capacitor elements and the first sealing layer as well as between the solid electrolytic capacitor elements and the second sealing layer, it is sufficient to provide the stress relaxation layer between at least one of the solid electrolytic capacitor elements and the first sealing layer as well as between at least one of the solid electrolytic capacitor elements and the second sealing layer. There may be a solid electrolytic capacitor element provided with the stress relaxation layer only on the first sealing layer side, there may be a solid electrolytic capacitor element provided with the stress relaxation layer only on the second sealing layer side, and there may be a solid electrolytic capacitor element provided with the stress relaxation layer on both the first sealing layer side and the second sealing layer side. The stress relaxation layer may be provided between all of the solid electrolytic capacitor elements and the first sealing layer or the second sealing layer, or locations where the stress relaxation layer is not provided between one or more solid electrolytic capacitor elements and the first sealing layer or the second sealing layer may exist.

In the capacitor array according to the present invention, in the case where the stress relaxation layer is provided inside the sheet removal part, it is sufficient for the stress relaxation layer to be provided inside at least one sheet removal part. The sheet removal part is preferably filled with the stress relaxation layer. Furthermore, the stress relaxation layer preferably penetrates a portion of the first sealing layer.

[Composite Electronic Component]

A composite electronic component according to the present invention includes the capacitor array according to the present invention, external electrodes which are provided on the outside of the first sealing layer or the second sealing layer of the capacitor array and which are connected to each of the anode plate and the cathode layer of the capacitor array, and electronic components connected to the external electrodes.

In the composite electronic component according to the present invention, the electronic components connected to the external electrodes may be passive elements or active elements. Both passive elements and active elements may be connected to the external electrodes, or either one of passive elements or active elements may be connected to the external electrodes. Also, composites of a passive element and an active element may be connected to the external electrodes.

Examples of passive elements include an inductor. Examples of active elements include memory, a graphical processing unit (GPU), a central processing unit (CPU), a micro-processing unit (MPU), and a power management IC (PMIC).

As described so far, the capacitor array according to the present invention has a sheet shape overall. Consequently, in the composite electronic component according to the present invention, the capacitor array can be handled like a mounting substrate, and electronic components can be mounted onto the capacitor array. Furthermore, by causing the electronic components to mount onto the capacitor array to have a sheet shape, it is also possible to connect the capacitor array and the electronic components in the thickness direction via through-electrodes that penetrate through each electronic component in the thickness direction. As a result, active elements and passive elements can be configured like a combined module.

For example, the capacitor array according to the present invention can be electrically connected between a voltage regulator including semiconductor active elements and a load supplied with a converted direct-current (DC) voltage, and a switching regulator can be formed.

In the composite electronic component according to the present invention, a circuit layer may be formed on either surface of a capacitor matrix sheet on which a plurality of capacitor arrays according to the present invention are laid out, and then connected to passive elements or active elements.

Also, the capacitor array according to the present invention may be disposed in a cavity provided in a substrate in advance and embedded with resin, and then a circuit layer may be formed on the resin. A different passive component or active component may also be installed in a different cavity of the same substrate.

Alternatively, the capacitor array according to the present invention may be mounted on a smooth carrier such as a wafer or glass, and after forming an outer layer part with resin, a circuit layer may be formed and then connected to passive elements or active elements.

REFERENCE SIGNS LIST 1, 1A, 1B, 1C, 1D, 1E, 1F, 1G: capacitor array
10A, 10B, 10C, 10D, 10E, 10F: solid electrolytic capacitor element
11: first sealing layer
12: second sealing layer
13: stress relaxation layer
20: chemically treated foil
21: anode plate
22: porous layer
23: dielectric layer
24: cathode layer
24$a$: solid electrolyte layer
24$b$: carbon layer
24$c$: copper layer
25, 25A: sheet removal part
30: insulating layer
31, 31X, 31Y, 31Z, 32: through-hole
41A, 41B, 41C, 41D, 41E, 41F: anodic external electrode
42A, 42B, 42C, 42D: cathodic external electrode
50: line conductor
50A: via conductor
51: anodic through-electrode
52: anodic via conductor
53, 54: anode interconnect pattern
61: cathodic through-electrode
62: cathodic via conductor
63, 64: cathode interconnect pattern
70: capacitance part
71: through-hole
72: insulating part
100: solid electrolytic capacitor sheet
110: capacitor element of different type from solid electrolytic capacitor element
S1: first main surface
S2: second main surface
$D_{10}$: anode plate interval
X: anode
Y: cathode

The invention claimed is:

1. A capacitor array comprising:
a plurality of solid electrolytic capacitor elements, each of the solid electrolytic capacitor elements including an anode plate made of a valve-action metal, a porous layer on at least one main surface of the anode plate, a dielectric layer on a surface of the porous layer, and a cathode layer including a solid electrolyte layer on a surface of the dielectric layer, each of the solid electrolytic capacitor elements being partitioned from each other by a slit-shaped removal part and having a first main surface and a second main surface which oppose each other in a thickness direction thereof;
a sheet-shaped first sealing layer on the first main surface side of each of the plurality of solid electrolytic capacitor elements; and
a sheet-shaped second sealing layer covering the plurality of solid electrolytic capacitor elements from the second main surface side,
wherein at least one solid electrolytic capacitor element of the plurality of solid electrolytic capacitor elements is disposed on an extension of the slit-shaped removal part demarcating a second solid electrolytic capacitor element of the plurality of solid electrolytic capacitor elements.

2. The capacitor array according to claim 1, wherein a distance from an underside of the second sealing layer to the anode plate of each of the solid electrolytic capacitor elements is constant.

3. The capacitor array according to claim 1, wherein a width of the slit-shaped removal part is 15 μm to 500 μm.

4. The capacitor array according to claim 1, wherein a width of the slit-shaped removal part is 15 μm to 200 μm.

5. The capacitor array according to claim 1, wherein a width of the slit-shaped removal part is 50 μm to 150 μm.

6. The capacitor array according to claim 1, wherein an aspect ratio of a length/width of the slit-shaped removal part is 10 or greater.

7. The capacitor array according to claim 1, wherein an aspect ratio of a length/width of the slit-shaped removal part is 10 to 1000.

8. The capacitor array according to claim 1, wherein at least a portion of the slit-shaped removal part does not extend over the entire capacitor array.

9. The capacitor array according to claim 1, wherein the plurality of solid electrolytic capacitor elements include two or more types of solid electrolytic capacitor elements each having capacitance parts with different surface areas.

10. The capacitor array according to claim 1, wherein the plurality of solid electrolytic capacitor elements include a solid electrolytic capacitor element having a capacitance part with a non-rectangular planar shape.

11. A composite electronic component comprising:
the capacitor array according to claim 1;
external electrodes on an outside of the first sealing layer or the second sealing layer of the capacitor array and connected, respectively, to each of the anode plate and the cathode layer of the capacitor array; and
an electronic component connected to the external electrodes.

12. A capacitor array, comprising:
a plurality of solid electrolytic capacitor elements, each of the solid electrolytic capacitor elements including an anode plate made of a valve-action metal, a porous layer on at least one main surface of the anode plate, a dielectric layer on a surface of the porous layer, and a cathode layer including a solid electrolyte layer on a surface of the dielectric layer, each of the solid electrolytic capacitor elements being partitioned from each other by a slit-shaped removal part and having a first main surface and a second main surface which oppose each other in a thickness direction thereof, a sheet-shaped first sealing layer on the first main surface side of each of the plurality of solid electrolytic capacitor elements; and a sheet-shaped second sealing layer covering the plurality of solid electrolytic capacitor elements from the second main surface side, wherein the slit-shaped removal part has a taper that decreases in width proceeding from the first main surface toward the second main surface or from the second main surface toward the first main surface of the plurality of solid electrolytic capacitor elements, wherein the porous layer is on both main surfaces of the anode plate, and the taper does not reach the porous layer near the second main surface of the plurality of solid electrolytic capacitor elements when the taper proceeds from the first main surface toward the second main surface or the taper does not reach the porous layer near the first main surface of the plurality of solid electrolytic capacitor elements when the taper proceeds from the second main surface toward the first main surface.

13. A capacitor array comprising:
a plurality of solid electrolytic capacitor elements, each of the solid electrolytic capacitor elements including an anode plate made of a valve-action metal, a porous layer on at least one main surface of the anode plate, a dielectric layer on a surface of the porous layer, and a cathode layer including a solid electrolyte layer on a surface of the dielectric layer, each of the solid electrolytic capacitor elements being partitioned from each other by a slit-shaped removal part and having a first main surface and a second main surface which oppose each other in a thickness direction thereof;

a sheet-shaped first sealing layer completely covering the first main surface side of each of the plurality of solid electrolytic capacitor elements;

a sheet-shaped second sealing layer covering the plurality of solid electrolytic capacitor elements from the second main surface side; and a stress relaxation layer between at least one of the plurality of solid electrolytic capacitor elements and the first sealing layer or the second sealing layer.

14. The capacitor array according to claim 13, wherein the stress relaxation layer extends inside the slit-shaped removal part.

15. The capacitor array according to claim 13, wherein the stress relaxation layer contains an insulating resin.

16. A capacitor array comprising:
a plurality of solid electrolytic capacitor elements, each of the solid electrolytic capacitor elements including an anode plate made of a valve-action metal, a porous layer on at least one main surface of the anode plate, a dielectric layer on a surface of the porous layer, and a cathode layer including a solid electrolyte layer on a surface of the dielectric layer, each of the solid electrolytic capacitor elements being partitioned from each other by a slit-shaped removal part and having a first main surface and a second main surface which oppose each other in a thickness direction thereof;

a sheet-shaped first sealing layer on the first main surface side of each of the plurality of solid electrolytic capacitor elements;

a sheet-shaped second sealing layer covering the plurality of solid electrolytic capacitor elements from the second main surface side; and a stress relaxation layer between at least one of the plurality of solid electrolytic capacitor elements and the first sealing layer or the second sealing layer, wherein the stress relaxation layer has a lower moisture permeability than at least one of the first sealing layer or the second sealing layer.

17. A capacitor array comprising:
a plurality of solid electrolytic capacitor elements, each of the solid electrolytic capacitor elements including an anode plate made of a valve-action metal, a porous layer on at least one main surface of the anode plate, a dielectric layer on a surface of the porous layer, and a cathode layer including a solid electrolyte layer on a surface of the dielectric layer, each of the solid electrolytic capacitor elements being partitioned from each other by a slit-shaped removal part and having a first main surface and a second main surface which oppose each other in a thickness direction thereof;

a sheet-shaped first sealing layer completely covering the first main surface side of each of the plurality of solid electrolytic capacitor elements;

a sheet-shaped second sealing layer covering the plurality of solid electrolytic capacitor elements from the second main surface side;

a first stress relaxation layer between the plurality of solid electrolytic capacitor elements and the first sealing layer; and a second stress relaxation layer between the plurality of solid electrolytic capacitor elements and the second sealing layer.

18. A capacitor array comprising:
a plurality of solid electrolytic capacitor elements, each of the solid electrolytic capacitor elements including an anode plate made of a valve-action metal, a porous layer on at least one main surface of the anode plate, a dielectric layer on a surface of the porous layer, and a cathode layer including a solid electrolyte layer on a surface of the dielectric layer, each of the solid electrolytic capacitor elements being partitioned from each other by a slit-shaped removal part and having a first main surface and a second main surface which oppose each other in a thickness direction thereof;

a sheet-shaped first sealing layer completely covering the first main surface side of each of the plurality of solid electrolytic capacitor elements;

a sheet-shaped second sealing layer covering the plurality of solid electrolytic capacitor elements from the second main surface side;

a first stress relaxation layer between at least a first of the plurality of solid electrolytic capacitor elements and the first sealing layer; and a second stress relaxation layer between at least a second of the plurality of solid electrolytic capacitor elements and the second sealing layer.

* * * * *